United States Patent
Xue et al.

(10) Patent No.: US 9,674,744 B2
(45) Date of Patent: Jun. 6, 2017

(54) TECHNIQUES FOR WIRELESS COMMUNICATION CHANNEL MANAGEMENT IN SHARED FREQUENCY BANDS

(71) Applicant: QUALCOMM Incorporated, San Diego, CA (US)

(72) Inventors: Qi Xue, San Diego, CA (US); Peerapol Tinnakornsrisuphap, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/857,340

(22) Filed: Sep. 17, 2015

(65) Prior Publication Data
US 2017/0086112 A1   Mar. 23, 2017

(51) Int. Cl.
*H04W 36/06* (2009.01)
*H04B 7/185* (2006.01)
*H04B 17/382* (2015.01)

(52) U.S. Cl.
CPC ........ *H04W 36/06* (2013.01); *H04B 7/18506* (2013.01); *H04B 17/382* (2015.01)

(58) Field of Classification Search
CPC ................................. H04B 1/005; H04B 1/053
See application file for complete search history.

(56) References Cited

U.S. PATENT DOCUMENTS

2008/0080553 A1   4/2008   Hasty et al.
2009/0323608 A1   12/2009  Adachi et al.
(Continued)

OTHER PUBLICATIONS

Diplom-Ingenieur G., et al., "Development and Performance Evaluation of an MAC Protocol for MC-CDMA Wireless LANs with QoS Support," Department of Communication Networks (ComNets), Faculty 6, RWTH Aachen University Jun. 19, 2006 (Jun. 19, 2006), pp. 43-70, XP002763173, Wissenschaftsverlag Mainz ISBN: 3-86130-931-9 Retrieved from the Internet: URL:http://www.comnets.rwth-aachen.de/publications/complete-lists/abstracts/singlepage/p/892.html?tx_cndownload_pi1%5bsubtype%5d=abstract [retrieved on Oct. 18, 2016] pp. 61-64.
(Continued)

*Primary Examiner* — Tuan H Nguyen
(74) *Attorney, Agent, or Firm* — Arent Fox, LLP

(57) ABSTRACT

Various aspects are provided for wireless communication channel management. For instance, aspects of an example method are provided, the method including detecting a trigger condition for changing an operating frequency of a wireless communication link between a first device and a second device. In addition, the example method may include obtaining a target operating frequency for the wireless communication link based on detecting the trigger condition. Moreover, the example method may include tuning a transceiver to the target operating frequency. In an example, the first device may be an unmanned aerial vehicle (UAV) and the second device may be a controller associated with the UAV. Additionally, example apparatuses and computer-readable media are provided for wireless communication channel management, the example apparatuses and computer-readable media being configured to perform, or store computer-executable code to perform, the disclosed example methods.

22 Claims, 15 Drawing Sheets

(56) References Cited

U.S. PATENT DOCUMENTS

| | | | | |
|---|---|---|---|---|
| 2014/0148211 A1* | 5/2014 | Mountford | ............ | H04W 52/10 455/522 |
| 2015/0116316 A1* | 4/2015 | Fitzgerald | .............. | G02B 27/01 345/419 |
| 2015/0119035 A1* | 4/2015 | Ganu | .................... | H04W 36/30 455/436 |

OTHER PUBLICATIONS

International Search Report and Written Opinion—PCT/US2016/047361—ISA/EPO—Oct. 31, 2016. (15 total pages).

* cited by examiner

TECHNIQUES FOR WIRELESS COMMUNICATION CHANNEL MANAGEMENT IN SHARED FREQUENCY BANDS

BACKGROUND

The present disclosure relates generally to telecommunications, and specifically to techniques for wireless communication channel management in shared frequency bands.

When communicating over a wireless communication channel, a pair of wireless communication devices, such as an unmanned aerial vehicle (UAV) and a remote UAV controller, may detect interference on the operating frequency or frequencies associated with the wireless communication channel. Naturally, such interference may be caused by other wireless communication devices concurrently transmitting signals over one or more of the same frequency bands as those utilized by the UAV and the controller.

In some examples, the interference may be generated by another wireless communication device whose presence is unknown to one or both of the UAV and the controller. For instance, if the UAV happens to be located in or near a building containing an unassociated access point, the presence of that unassociated access point may be unknown to the controller associated with the UAV, for example, if the controller is located outdoors. Likewise, if the controller is located near another controller that concurrently transmits signals over the same operating frequency, the UAV may be unaware of the other, interfering controller when the UAV is located outside of the signal range of the interfering controller (e.g., at a relatively high altitude). In other instances, an interfering separate UAV that is unknown to the controller (and/or its corresponding UAV) may transmit interfering signals to its own other corresponding controller. In each of these example scenarios, there is a relatively high likelihood of signal "collision," which occurs when multiple wireless communication devices whose transmission ranges overlap attempt to concurrently utilize a limited frequency bandwidth. As a result, each of the devices attempting to receive and decode a unique signal of the multiple colliding signals transmitted over a channel shared by the multiple transmitting devices may be unable to differentiate the unique signal from other colliding signals.

Therefore, improved techniques for wireless communication channel management are needed.

SUMMARY

The present disclosure presents example methods and apparatuses for improved wireless communication channel management. For instance, an example method for wireless communication channel management is presented that may include detecting a trigger condition for changing an operating frequency band of a wireless communication link between a first device and a second device. The example method may also include obtaining a target operating frequency band for the wireless communication link based on detecting the trigger condition. In addition, the example method may include tuning a transceiver to the target operating frequency band.

The present disclosure also describes an example apparatus for wireless communication channel management, which may include means for detecting a trigger condition for changing an operating frequency band of a wireless communication link between a first device and a second device. Additionally, the example apparatus may include means for obtaining a target operating frequency band for the wireless communication link based on detecting the trigger condition. Furthermore, the example apparatus may include means for tuning a transceiver to the target operating frequency band.

In addition, the present disclosure describes an example apparatus for wireless communication channel management, the example apparatus including a transceiver, a processor, and a memory coupled to the processor. In an aspect, the memory may store instructions, that when executed by the processor, cause the processor to detect a trigger condition for changing an operating frequency band of a wireless communication link between a first device and a second device. In addition, the memory may store instructions, that when executed by the processor, cause the processor to obtain a target operating frequency band for the wireless communication link based on detecting the trigger condition. What is more, the memory may store instructions, that when executed by the processor, cause the processor to tune the transceiver to the target operating frequency band.

In an additional aspect, the present disclosure contemplates an apparatus for wireless communication channel management, which may include a trigger condition detecting component configured to detect a trigger condition for changing an operating frequency band of a wireless communication link between a first device and a second device. The example apparatus may also include a target operating frequency band obtaining component configured to obtain a target operating frequency band for the wireless communication link based on detecting the trigger condition. Additionally, the example apparatus may include a frequency tuner for tuning a transceiver to the target operating frequency band.

Further presented is a computer-readable medium storing computer-executable code for wireless communication channel management. In an aspect, the computer-executable code may include code for detecting a trigger condition for changing an operating frequency band of a wireless communication link between a first device and a second device. The computer-executable code may also include for obtaining a target operating frequency band for the wireless communication link based on detecting the trigger condition and code for tuning a transceiver to the target operating frequency band.

As will be realized, these aspects may be implemented in other and different forms and its several details are capable of modification in various other respects. Accordingly, the drawings and detailed description are to be regarded as illustrative in nature and not as restrictive

BRIEF DESCRIPTION OF THE DRAWINGS

Various aspects of apparatuses and methods will now be presented in the detailed description by way of example, and not by way of limitation, with reference to the accompanying drawings, wherein.

DETAILED DESCRIPTION

Figure 1:
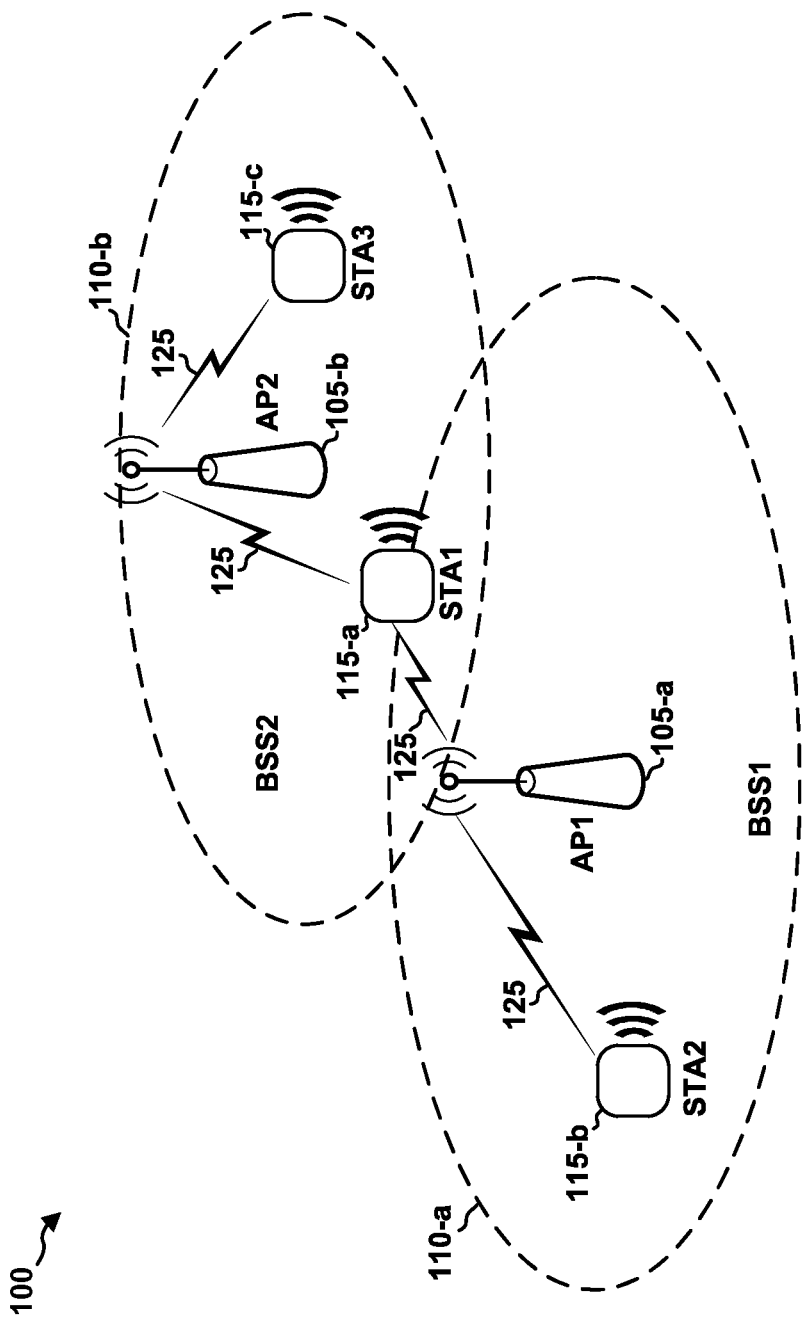
FIG. 1 is a conceptual diagram illustrating an example of a wireless local area network (WLAN) deployment.

Various concepts will be described more fully hereinafter with reference to the accompanying drawings. These concepts may, however, be embodied in many different forms by those skilled in the art and should not be construed as limited to any specific structure or function presented herein. Rather, these concepts are provided so that this disclosure will be thorough and complete, and will fully convey the scope of these concepts to those skilled in the art. The detailed description may include specific details. However, it will be apparent to those skilled in the art that these concepts may be practiced without these specific details.

Techniques have been developed for decreasing the likelihood of signal collision in wireless communication environments. One such technique is Carrier Sense Multiple Access with Collision Avoidance (CSMA/CA), which when implemented by a wireless communication device, causes the device to pause transmission of one or more signals over a particular operating frequency band (which may define a wireless communication channel) when the device detects that another device is already transmitting over the same frequency band. If the wireless communication device determines that the operating frequency is not being utilized after pausing transmission, the device transmits the one or more signals whose transmission was previously paused after waiting a randomly generated time interval (or "backoff period").

If another wireless device, which may be located in the same wireless communication environment as the transmitting device and receiving device, is "hidden" (i.e., located in a position that renders the particular device unable to detect or receive wireless transmissions from the transmitting device), the device may perform transmission as if the operating frequency is not being utilized, causing signal collision with transmissions of the transmitting device.

To reduce signal collisions due to "hidden" device, some wireless communication devices (e.g., devices employing the Institute of Electrical and Electronics Engineers (IEEE) 802.11 family of wireless communication protocols) may utilize a technique called Request to Send/Clear to Send (RTS/CTS) to reduce the overhead associated with signal collision in a wireless communication environment. According to RTS/CTS, before a wireless communication device transmits one or more signals to a receiving device over a frequency band, the transmitting device transmits an RTS message to the receiving device (or, in some instances, a separate channel management device configured to regulate signal transmission in a particular wireless communication environment). Upon receiving the RTS message, the receiving device (or channel management device) may determine whether the frequency band is free of other ongoing (or scheduled) signal transmissions that may potentially cause signal collision over the frequency band. When it is determined that the frequency band is clear of potentially colliding signals, the receiving device or channel management device can generate and transmit a CTS message indicating that transmitting device is free to send the one or more signals that prompted the RTS message. When the transmitting device receives the CTS, it transmits the one or more signals to over the specified frequency band.

However, in certain wireless applications, such as applications that may require relatively fast data communication (e.g., video streaming) between devices with limited processing capability, the overhead and associated processing resources required to implement RTS/CTS can cause data communication rates for such wireless applications to fall below acceptable levels.

To address the problems associated with these techniques, the present disclosure provides various aspects for channel management in wireless communication devices. In some implementations, the wireless communication devices may be involved in aerial device operations, such as a UAV and an associated UAV controller (or simply "controller") which communicate in a wireless communication environment. In other implementations, the wireless communication devices may include other types of communication devices not involved in aerial device control, such as an access point communicating with other types of stations (e.g., wireless communication device, computer, smartphone, etc.). In an aspect of the present disclosure, the wireless communication devices may be configured to determine that one or more trigger conditions for changing an operating frequency band exist. These trigger conditions may indicate that interference, or indications of interference, are present in an operating frequency band over which the devices have established a communication link. Furthermore, in response to detecting that such a trigger condition exists, one or both of the devices may initiate a procedure for changing the operating frequency band (or corresponding channel) to a target operating frequency band in an effort to avoid the interference and maintain adequate quality in the communication link.

In addition, the present disclosure presents several example techniques for selecting the target operating frequency band. For instance, upon establishment of the communication link, the devices may determine an operating frequency band sequence and may sequentially tune to a next operating frequency band in the operating frequency band sequence when a trigger condition is detected. In such examples, the trigger condition that initiates tuning to the next operating frequency band in the operating frequency band sequence may include a determination that a time period has elapsed since a most recent frequency band change, a most recent successful data packet (e.g., video packet, voice packet, etc.) delivery, or a most recent successful pilot packet delivery over the operating frequency band.

Additionally or alternatively, the each of the devices may be configured to individually generate and transmit a request to change the operating frequency band to a particular target operating frequency band based on detecting that a trigger condition exists. In some examples, this trigger condition may include determining that a frame decoding failure rate or a transmission packet error rate associated with communication over the operating frequency band exceeds a respective threshold value. In some non-limiting examples, such a threshold may be a percentage value representing a number of frames out of a set of transmitted frames that were not successfully decoded by a receiving device (i.e., where frame decoding failure rate is utilized). Furthermore, the threshold may be a percentage value representing a number of packets out of a set of packets transmitted by a transmitting device that were not successfully received and/or decoded by a receiving device. In any case, such a percentage value for the threshold may be any percentage value, including, but not limited to, 50%. Furthermore, rather than determining an operating frequency band sequence upon establishment of the communication link, each of the devices may be configured to include a target operating frequency band in the generated request. As a result, the devices may tune to the target operating frequency band to continue further packet communication, for example, if the request is approved by the device receiving the request. In a further optimization, the request and associated response may be integrated into the RTS/CTS procedure discussed above.

Therefore, by utilizing one or more of the techniques presented by the present disclosure, one or more communications devices (e.g., a UAV and a controller) may change an operating frequency band in response to determining that a trigger condition exists, and as such, may avoid drawbacks, such as degraded channel conditions and potential collision, associated with interference in the operating frequency band. In other words, wireless communication devices described in the present disclosure may perform coordinated wireless communication channel changes to reduce persistent interference on one or more channels in a wireless communication environment. As such, these wireless communication devices may avoid becoming locked into utilizing a congested channel that has an increased associated probability of collision, which may in turn reduce the chances of any long-term communication interruptions.

FIG. 1 is a conceptual diagram 100 illustrating an example of a wireless local area network (WLAN) deployment in connection with various techniques described herein for wireless communication channel management. The WLAN may include one or more access points (APs) and one or more mobile stations (STAs) associated with a respective AP. The WLAN deployment of FIG. 1 may also be said to be deployed in an "infrastructure mode," whereby each AP may serve as a network access hub and may communicate with, and provide wireless network access to, one or more associated STAs 115. An alternative ad hoc (or "peer-to-peer" (P2P) network deployment is described below in reference to FIGS. 2A and 2B.

In the infrastructure mode example illustrated in FIG. 1, there are two APs deployed: AP1 105-*a* in basic service set 1 (BSS1) and AP2 105-*b* in BSS2. AP1 105-*a* is shown having at least two associated STAs (STA1 115-*a* and STA2 115-*b*) and coverage area 110-*a*, while AP2 105-*b* is shown having at least two associated STAs (STA1 115-*a* and STA3 115-*c*) and coverage area 110-*b*. In the example of FIG. 1, the coverage area of AP1 105-*a* overlaps part of the coverage area of AP2 105-*b* such that STA1 115-*a* is within the overlapping portion of the coverage areas. The number of BSSs, APs, and STAs, and the coverage areas of the APs described in connection with the WLAN deployment of FIG. 1 are provided by way of illustration and not of limitation. Moreover, aspects of the various techniques described herein may be based on the example infrastructure mode WLAN deployment of FIG. 1 but need not be so limited. For instance, the aspects of these techniques may be used for communication between two paired wireless communication devices, such as devices implementing an ad hoc or P2P WLAN deployment, which is presented below in reference to FIGS. 2A and 2B.

The APs (e.g., AP1 105-*a* and AP2 105-*b*) shown in FIG. 1 are generally relatively fixed terminals that provide backhaul services to STAs within its coverage area or region. In some applications, however, the AP may be a mobile or non-fixed terminal. For instance, in some applications, the AP 105 may consist of a mobile device (e.g. a UAV such as, but not limited to, a drone, see FIG. 2B), or, in other examples, may consist of a handheld or otherwise mobile controller associated with a particular STA 115 (e.g., where the STA 115 is a UAV). The STAs (e.g., STA1 115-*a*, STA2 115-*b* and STA3 115-*c*) shown in FIG. 1, which may be fixed, non-fixed, or mobile terminals, utilize the backhaul services of their respective AP 105 to connect to a network, such as the Internet. In some alternative examples, the AP 105 may be battery-powered and relatively mobile, and backhaul services provided by the AP 105 may partially consist of an over-the-air communication link between the AP 105 and a separate, fixed communication device such as a fixed AP 105, a base station or eNodeB of a cellular network, or any other device that is configured to ultimately interface with a core network (e.g., the Internet) to provide application or communication services to one or more communication devices (e.g., STAs 115). In addition, an AP 105 of the present disclosure may be configured to transmit pilot signals or beacon signals (including one or more pilot packets or beacon packets) that may be received by an STA 115 and utilized for time synchronization between the AP 105 and STA 115.

Examples of an STA include, but are not limited to: a UAV (e.g., a drone), a cellular phone, a smart phone, a laptop computer, a desktop computer, a personal digital assistant (PDA), a personal communication system (PCS) device, a personal information manager (PIM), personal navigation device (PND), a global positioning system, a multimedia device, a video device, an audio device, a device for the Internet-of-Things (IoT), or any other suitable wireless apparatus requiring the backhaul services of an AP. An STA may also be referred to by those skilled in the art as: a subscriber station, a mobile unit, a subscriber unit, a wireless unit, a remote unit, a mobile device, a wireless device, a wireless communication device, a remote device, a mobile subscriber station, an access terminal, a mobile terminal, a wireless station, a remote terminal, a handset, a user agent, a mobile client, a client, user equipment (UE), or some other suitable terminology. An AP may also be referred to as: a controller, a UAV controller, a drone controller, a mobile station controller, base station, a base transceiver station, a radio base station, a radio transceiver, a transceiver function, or any other suitable terminology. In a non-limiting example, the mobile station 115 may be an UAV (e.g., a drone) and the AP 105 may be a controller configured to manage the flight movement, tracking, location, audio and video capture functionality, settings, take-off and landing procedure, communication properties, or any other functionality or setting associated with the UAV. Furthermore, though communication between a UAV and its controller pair constitutes an example use-case for techniques described in the present disclosure, various concepts described throughout this disclosure are intended to apply to all suitable wireless apparatus, networks, and environments, regardless of their specific architectures or nomenclature.

Each of STA1 115-a, STA2 115-b, and STA3 115-c may be implemented with a protocol stack. The protocol stack can include a physical layer for transmitting and receiving data in accordance with the physical and electrical specifications of the wireless channel, a data link layer for managing access to the wireless channel, a network layer for managing source to destination data transfer, a transport layer for managing transparent transfer of data between end users, and any other layers necessary or desirable for establishing or supporting a connection to a network.

Each of AP1 105-a and AP2 105-b can include software applications and/or circuitry to enable associated STAs to connect to a network via communication links 125. The APs can send frames to their respective STAs and receive frames from their respective STAs to communicate data and/or control information (e.g., signaling). In an aspect, these frames may include data transmitted in one or more protocol data units (PDUs). In some instances, the PDUs may be communicated between the APs and their respective STAs according to a Physical Layer Convergence Protocol (PLCP), which is a wireless communication protocol defined by Institute of Electrical and Electronics Engineers (IEEE), for example, in IEEE 802.6.

Each of AP1 105-a and AP2 105-b can establish a communication link 125 with an STA that is within the coverage area of the AP. Communication links 125 can comprise communications channels that can enable both uplink and downlink communications. When connecting to an AP, an STA can first authenticate itself with the AP and then associate itself with the AP. Once associated, a communication link 125 can be established between the AP and the STA such that the AP and the associated STA can exchange frames, packets and PDUs, and/or messages through a direct communications channel defined by a particular operating frequency band.

While aspects for wireless communication channel management are described by the present disclosure in connection with a WLAN deployment or the use of IEEE 802.11-compliant networks, those skilled in the art will readily appreciate, the various aspects described throughout this disclosure may be extended to other networks employing various standards or protocols including, by way of example, BLUETOOTH® (Bluetooth), HiperLAN (a set of wireless standards, comparable to the IEEE 802.11 standards, used primarily in Europe), and other technologies used in wide area networks (WAN)s, WLANs, personal area networks (PAN)s, or other suitable networks now known or later developed. Thus, the various aspects presented throughout this disclosure for wireless channel management may be applicable to any suitable wireless network regardless of the coverage range and the wireless access protocols utilized.

Figure 2A:
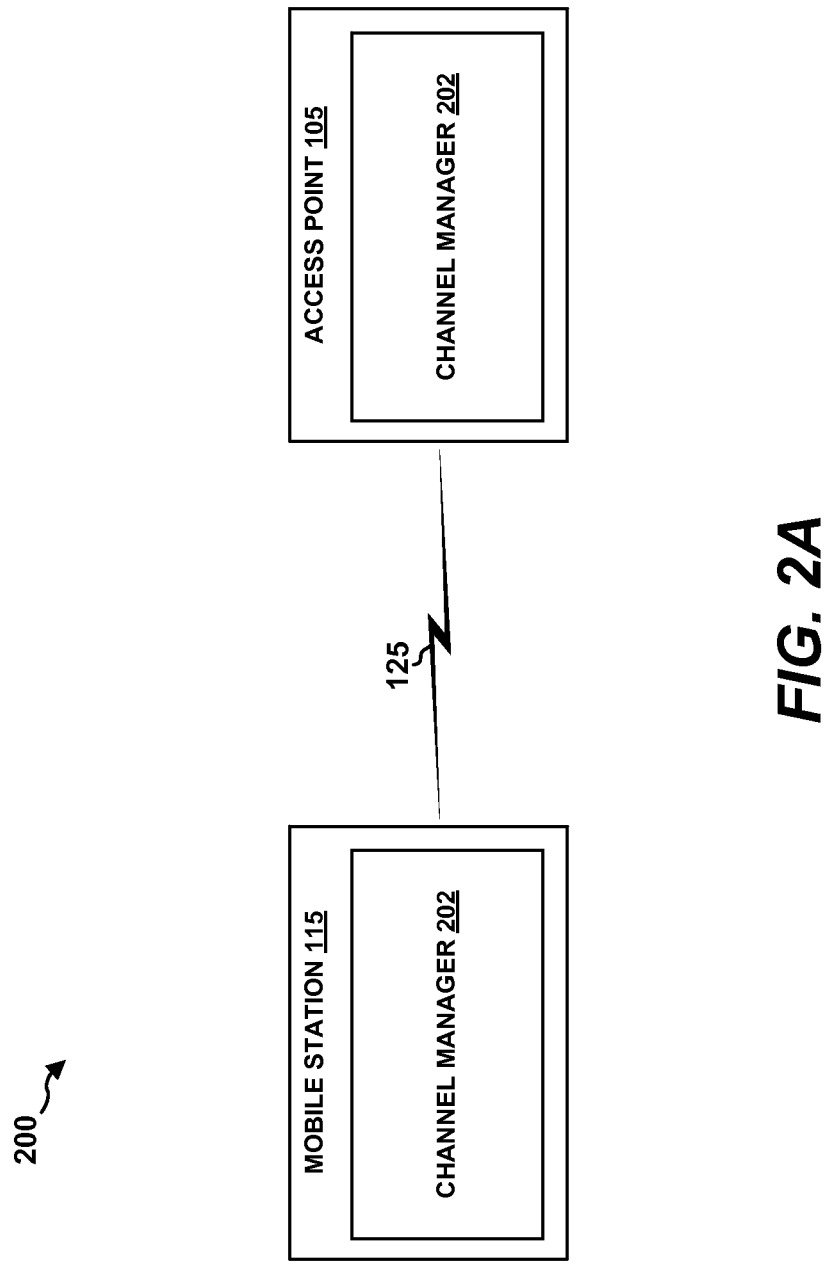
FIG. 2A is a block diagram illustrating an example of a WLAN deployment containing a paired mobile station and access point.

FIG. 2A shows a block diagram 200 illustrating an example network deployment in which a pair of wireless communication devices (i.e., a first device and a second device) consisting of a mobile station 115 (e.g., STA 115 of FIG. 1) and an access point 105 (e.g., AP 105 of FIG. 1) communicate with one another over a communication link 125. In a non-limiting example, STA 115 may be a UAV and AP 105 may be a controller associated with the UAV, or vice versa.

In an aspect, the communication link 125 may facilitate the communication of packet data, pilot packets or signals, control data, or any other wireless signal type over an operating frequency band. In addition, the operating frequency band utilized for wireless communication by the devices (e.g., a mobile station and an access point) at a particular time may be associated with a wireless communication channel defined by one or more wireless communication protocols (e.g. a protocol of the IEEE 802.11 family of protocols). As such, for purposes of the present disclosure, the terms "operating frequency band" and "target operating frequency band" may refer to a discrete range of frequency values (e.g., a 20 MHz-wide channel with a center frequency located at 2437 MHz), but may also refer to a numbered channel defined by a wireless communication protocol (e.g., channel 6 of the IEEE 802.11b protocol) that may be associated with the discrete range of frequency values.

In an aspect of the present disclosure, the operating frequency band may change over time in response to a determination by one or both of STA 115 or AP 105 that a trigger condition exists for changing the operating frequency band to a target operating frequency band. In addition, the operating frequency bands that are available for use as communication link 125 may be non-overlapping frequency bands defining non-overlapping channels in a WLAN deployment. In other words, in some examples, any operating frequency band or target operating frequency band used for communication over communication link 125 may be selected from a set of non-overlapping operating frequency bands or associated channels in an available WLAN bandwidth, where each of the non-overlapping frequency bands is defined as not containing a particular frequency of any other operating frequency band.

In addition, as illustrated in FIG. 2A, each of STA 115 and AP 105 may include a channel manager 202, which may configured to implement the techniques for wireless channel management described in the present disclosure. Furthermore, although not expressly shown in FIG. 1, one or more STAs 115 and/or APs 105 of an infrastructure deployment as illustrated in FIG. 1 may also include a channel manager 202 of FIG. 2A.

Figure 2B:
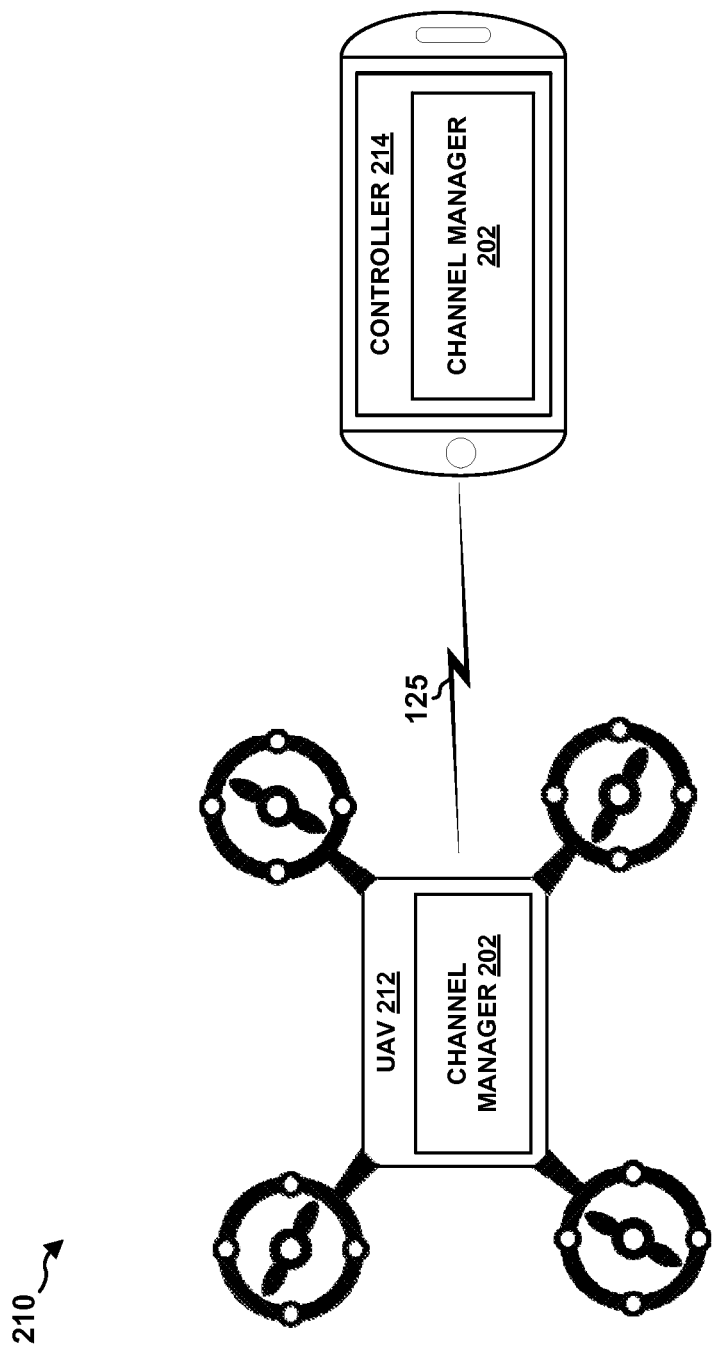
FIG. 2B is a block diagram illustrating an example of a WLAN deployment containing a paired UAV and controller as the mobile station and the access point.

FIG. 2B shows a block diagram 210 illustrating an example network deployment in which a pair of wireless communication devices consisting of a UAV 212 and a controller 214 that are configured to communicate with one another over a communication link 125. In some examples, the deployment illustrated in FIG. 2B may constitute a WLAN deployment whereby the UAV 212 and controller 214 are "paired," which, for purposes of the present disclosure, may mean that controller 214 does not communicate with any other STAs or UAVs (other than UAV 212) during a particular communication session, and UAV 212 does not communicate what any other controllers or APs (other than controller 214) during the communication session. In addition, the controller 214 and may be configured to remotely control the movement, video and sound capture functionality, power management, take-off, landing, or any other functionality or settings of the UAV 212. In addition, UAV 212 may include one or more cameras (e.g., cameras having one or more pixel counts, such as, but not limited to, 14 megapixel camera(s)). In addition, the UAV 212 may include a battery or other on-board power supply that allows for a particular flight duration, which, in some examples, may be about twelve minutes. The UAV 212 and controller 214 of FIG. 2B may be configured for relatively long-range communication (e.g., up to 2 or more kilometers) that is reliable and exhibits low latency to facilitate substantially real-time video feedback from the UAV 212 to controller 214, which allows an operator to receive up-to-the-second views and location information to ensure that the operator can safely maneuver the UAV 212 around objects or restricted areas. In addition, to facilitate the substantially real-time video communication, the communication link 125 and its associated operating frequency band at any given time may exhibit high data rates that are quickly adaptable to changing channel and/or environmental conditions. Moreover, the UAV 212 and its controller 214 may exhibit a relatively low energy consumption profile to maximize flight time.

Furthermore, either of the UAV 212 or controller 214 may correspond to the STA 115 of FIGS. 1 and/or 2A and either of UAV 212 or controller 214 may correspond to the AP 105 of FIGS. 1 and/or 2A. In an additional aspect, though the specific deployment scenario of FIG. 2A may differ from the infrastructure mode deployment of FIG. 1, any of the features of UAV 212 and controller 214 described above in reference to FIG. 1 that are not specific or exclusive to an infrastructure-mode deployment may also be implemented by UAV 212 and controller 214 of FIG. 2B.

In an aspect, the communication link 125 may facilitate the communication of packet data, pilot packets or signals, control data, or any other wireless signal type over an operating frequency band. For instance, though not limited to these communications, communication link 125 may facilitate communication of one or more pilot control commands, automatic navigation signals, video feed data (e.g., substantially live or real-time), UAV-to-UAV communications (e.g., traffic management signals), controller-to-handheld communications (e.g., where the handheld may be a third-party device, such as a tablet, smart phone, laptop, or any other wireless communication device other than the UAV 212 or controller 214), handheld-to-controller communications, UAV-to-handheld communications, handheld-to-UAV communications, geopositional, tracking, or automated movement commands configured to facilitate the UAV 212 following the geographic positional movement of the controller 214.

In addition, the operating frequency band utilized for wireless communication by paired devices UAV 212 and controller 214 at a particular time may be associated with a wireless communication channel defined by one or more wireless communication protocols (e.g. a protocol of the IEEE 802.11 family of protocols). Like the deployment of FIG. 2A, in the deployment of FIG. 2B, the terms "operating frequency band" and "target operating frequency band" may refer to a discrete range of frequency values (e.g., a 22 MHz-wide channel with a center frequency located at 2437 MHz), but may also refer to a numbered channel defined by a wireless communication protocol (e.g., channel 6 of the IEEE 802.11b protocol) that may be associated with the discrete range of frequency values.

In addition, the operating frequency band may change over time in response to a determination by one or both of UAV 212 or controller 214 that a trigger condition exists for changing the operating frequency band to a target operating frequency band. In addition, the operating frequency bands that are available for use as communication link 125 may be non-overlapping frequency bands defining non-overlapping channels in a WLAN deployment. In other words, in some examples, any operating frequency band or target operating frequency band used for communication over communication link 125 may be selected from a set of non-overlapping operating frequency bands or associated channels in an available WLAN bandwidth, where each of the non-overlapping frequency bands is defined as not containing a particular frequency of any other operating frequency band. In addition, as illustrated in FIG. 2B, each of UAV 212 and controller 214 may include a channel manager 202, which may configured to implement the techniques for wireless channel management described in the present disclosure.

In an additional aspect of the present disclosure, any component, technique, deployment, method, device, computer-readable medium, code, processor-executable instruction, or other aspect described in the present disclosure (e.g., in reference to one or more of FIGS. 1, 2A, and 3-14) in relation to an STA 115 or an AP 105 may be likewise implemented in a UAV 212 or a controller 214. Furthermore, although not expressly shown in FIG. 1, the STAs 115 and APs 105 may correspond to either of UAV 212 or controller 214 of FIG. 2B.

Figure 3:
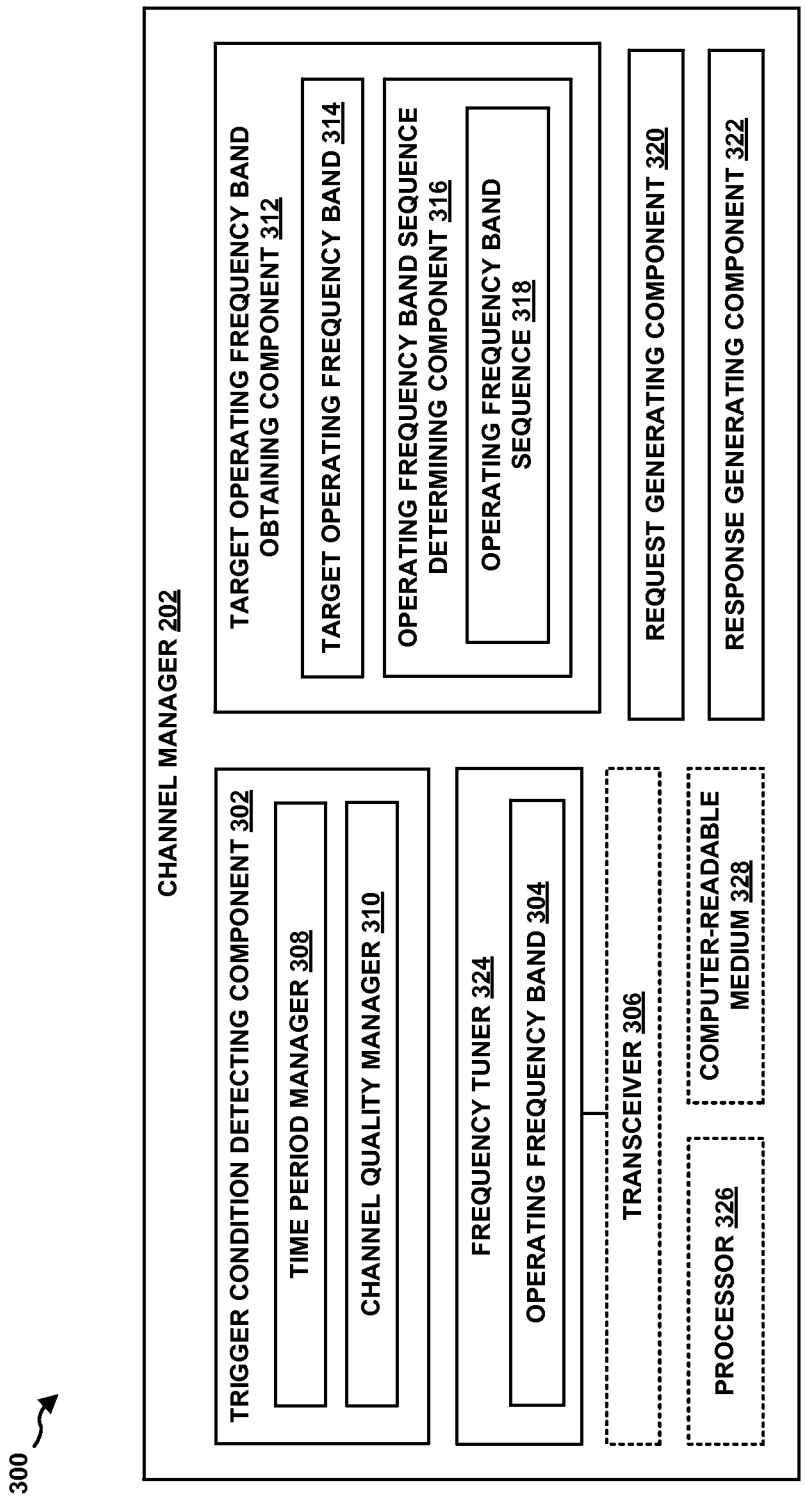
FIG. 3 is a block diagram illustrating an example of a channel manager of the present disclosure.

FIG. 3 shows a block diagram 300 illustrating an example channel manager 202 of the present disclosure, which may correspond to channel manager 202 of FIGS. 2A and/or 2B, which may be implemented in one or more of STA 115, AP 105, UAV 212, and controller 214. In an aspect, the channel manager 202 may include one or more components that may perform aspects of wireless channel management disclosed in the present disclosure. Each of these one or more components, and the channel manager 202 itself, may be implemented as hardware, processor- or computer-executable instructions, or a combination thereof. For instance, in one example implementation, processor 326 may be configured to execute instructions for performing one or more aspects of the techniques for wireless channel management disclosed herein. Specifically, the processor 326 may execute instructions stored on the computer-readable medium 328 to perform the functions and features described in connection with the channel manager 202, or any sub-components thereof, such as the trigger condition detecting component 302, the frequency tuner 324, the transceiver 306, the target operating frequency band obtaining component 312, the request generating component 320, and the response generating component 322. In an aspect, these processor-executable instructions may be stored on a computer-readable medium 328, which may be a memory configured to store such instructions. In addition, as shown in FIG. 3, the transceiver 306, the processor 326 and the computer-readable medium 328 may be components of channel manager 202 in some examples. In other examples, as represented by the dotted lines of items 306, 326 and 328, one or both of the transceiver 306, the processor 326 and the computer-readable medium 328 may be external to the channel manager 202 but may communicate with channel manager 202 to perform aspects of the wireless channel management techniques disclosed herein.

Channel manager 202 may include a trigger condition detecting component 302, which may be configured to detect whether a trigger condition exists for initiating a change in an operating frequency band 304 utilized by a transceiver 306 of a wireless communication device. In an example implementation of the present disclosure, a pair of wireless communication devices (e.g., an STA 115 and an AP 105 of FIGS. 1 and 2) may communicate by transmitting various signals over the operating frequency band 304. These signals may include information, such as, but not limited to, control information (e.g., address information, power control information, mobility management information), pilot data, or user data (e.g., application data such as video data, voice data, etc.), and the information may be organized into one or more packets or protocol data units (PDUs). In an aspect, trigger condition detecting component 302 may be configured to obtain and maintain timing, characteristic, and/or channel quality information associated with transmissions over operating frequency band 304 (or a corresponding channel) that may be utilized to determine whether a trigger condition exists for initiating a change in operating frequency band 304. For instance, such timing information may include, for instance, a time period since a most recent successful data packet delivery or a time period since a most recent successful pilot packet delivery. The characteristic information may include information regarding whether a particular transmission contains (or a previous transmission contained) a data packet, a pilot (or beacon) packet, a control information packet, or a portion thereof. Additionally, the channel quality information may include a receiver frame decoding failure rate (or frame error rate (FER)) that represents a ratio of a number of packets that are not successfully received and decoded to a total number of packets received by a receiving communications device over a specified time period. The channel quality information may also include a transmission packet error rate that represents a ratio of a number of packets that are not successfully transmitted to a total number of packets transmitted by a transmitting device over a specified time period.

In an aspect, trigger condition detecting component 302 may include a time period manager 308, which may be configured to maintain one or more timers, store one or more threshold time period values, compare the value of the one or more timers to the one or more threshold time period values, and detect whether any of the various time periods associated with the present wireless channel management techniques have elapsed. For instance, the time period manager 308 may be configured to detect that a first threshold time period since a most recent operating frequency band change has elapsed. In an aspect, this first threshold time period may be set by either the STA 115, the AP 105, or may be negotiated by the STA 115 and AP 105 during establishment of the communication link 125 and may represent a time period that the STA 115 and AP 105 remain communicating a particular operating frequency band 304 before changing the operating frequency band 304. To implement this aspect, the time period manager 308 may start a timer upon tuning to a new operating frequency band 304 and may continuously compare its timer value to the first threshold time period. When the timer value reaches the first threshold time period, the time period manager 308 and/or the trigger condition detecting component 302 may determine that a trigger condition exists.

Furthermore, in some use-cases, the STA 115 and AP 105 may conceivably be located in close proximity to another STA/AP pair that may not only communicate over the same operating frequency band as STA 115 and AP 105, but may also implement the technique of periodically changing the operating frequency band to a target operating frequency band after a first threshold time period. If, by chance, the other STA/AP group has a similar sequence of operating frequency bands to which it changes and it changes the operating frequency band at a similar interval as the STA 115 and AP 105 (i.e., has a similar first threshold time period as the STA 115 and AP 105), both STA/AP pairs could potentially change to the same operating frequency bands at substantially the same time as the other STA/SP pair, which may lead to significant collision between transmissions of each of the pairs over the same operating frequency bands.

As such, in an aspect of the present disclosure, the time period manager 308 may be configured to generate a random value (e.g., using a random number generation algorithm) for the first threshold time period such that neither of the pairs change their respective operating frequency band 304 at a same rate, which is defined by the first threshold time period. In some non-limiting examples, the first threshold time period may have a duration that is anywhere from hundreds of milliseconds to seconds in length.

In addition, the trigger condition detecting component 302 may be configured to detect that a second threshold time period since a most recent successful data packet delivery has elapsed. In an aspect, this second threshold time period may be set by either the STA 115, the AP 105, or may be negotiated by the STA 115 and AP 105 during establishment of the communication link 125 and may have a same or a different value than the first threshold time period or the third threshold time period defined below. The second threshold time period may represent a maximum time period that the STA 115 and AP 105 are to remain communicating over a particular operating frequency band 304 after a most recent successful data packet delivery over the operating frequency band 304 before changing the operating frequency band 304. The second threshold time period may represent or may be associated with an application requirement of the data communication between the STA 115 and AP 105 of FIG. 2A or between UAV 212 and controller 214 of FIG. 2B. For example, in some examples, the controller 214 may receive real-time video frame from UAV 212 approximately every 33 ms, and the second threshold time period may be related to this data reception rate. In an aspect, a "successful" packet delivery for purposes of the present application may mean that a packet has been received and decoded the packet and the packet has passed a reception quality check, such as, but not limited to, a cyclic redundancy check (CRC). The time period manager 308 may start a timer after each successful data packet delivery and may continuously compare its timer value to the second threshold time period. When the timer value reaches the second threshold time period, the time period manager 308 and/or the trigger condition detecting component 302 may determine that a trigger condition exists.

Furthermore, the trigger condition detecting component 302 may be configured to detect that a third threshold time period since a most recent successful packet delivery has elapsed. In an aspect, this third threshold time period may be set by either the STA 115, the AP 105, or may be negotiated by the STA 115 and AP 105 during establishment of the communication link 125 and may have a same or a different value than the first threshold time period or the second threshold time period defined above. The third threshold time period may represent a maximum time period that the STA 115 and AP 105 are to remain communicating over a particular operating frequency band 304 after a most recent successful pilot packet delivery over the operating frequency band 304 before changing the operating frequency band 304. For example, in some implementations, the controller 214 may transmit keep-alive pilot signals to UAV 212 ranging from every tens of milliseconds to every few seconds. As such, the third threshold time period may be set in this duration range associated with the keep-alive pilot signal transmissions. In an aspect, a "successful pilot packet delivery" for purposes of the present application may mean that a pilot packet has been received and decoded by a receiving device and the pilot packet has passed a reception quality check, such as, but not limited to, a CRC. The time period manager 308 may start a timer after each successful data packet delivery and may continuously compare its timer value to the third threshold time period. When the timer value reaches the third threshold time period, the time period manager 308 and/or the trigger condition detecting component 302 may determine that a trigger condition exists.

In addition, the trigger condition detecting component 302 may include a channel quality manager 310, which may be configured to obtain (e.g., receive or generate) values of one or more metrics associated with the quality of communications over the operating frequency band 304, store one or more threshold values for certain quality metrics, compare the value of the one or more quality metrics to the one or more threshold values, and determine whether any of the obtained metric values associated with an operating frequency band 304 exceed a corresponding threshold value.

In an aspect of the present disclosure, examples of quality metrics associated with an operating frequency band may include a decoding failure rate and a transmission packet error rate. As such, channel quality manager 310 may be configured to detect whether a receiver frame decoding failure rate exceeds a receiver frame decoding failure rate threshold value. In addition, the channel quality manager 310 may be configured to determine whether a transmission packet error rate exceeds a transmission packet error rate threshold value. If the channel quality manager 310 determines that either of these quality metric values exceeds its corresponding threshold value, the trigger condition detecting component 302 may correspondingly determine that a trigger condition exists. Furthermore, upon detecting that a trigger condition exists, the trigger condition detecting component 302 may be configured to generate a signal that indicates that the trigger condition exists and send the signal to the frequency tuner 324 to initiate a change in the operating frequency band 304 to a target operating frequency band 314. In an aspect, in response to the frequency tuner 324 initiating a change in the operating frequency band 304, the channel manager 202 may be configured to reset a state of its associated wireless communication device, which may include resetting a retransmission counter (or retry counter) or backoff contention window associated with previous transmissions, attempted transmissions, or retransmissions over a previous operating frequency band.

In addition, channel manager 202 may include a target operating frequency band obtaining component 312, which may be configured to obtain a target operating frequency band 314 to which the wireless communication link between the STA 115 and AP 105 may change, for example, based on the trigger condition detecting component 302 detecting the trigger condition. In an example technique presented by the present disclosure, an STA 115 and an AP 105 may begin communication by initiating establishment of a communication link between the devices. During this communication link establishment process, the STA 115 and AP 105 may exchange information necessary for establishing the communication, such as an initial operating frequency band upon which the devices may initiate the communication link. In addition, an operating frequency band sequence determining component 316 of the target operating frequency band obtaining component 312 may be configured to determine an operating frequency band sequence 318 during initial establishment of the wireless communication link. In some examples, the operating frequency band sequence determining component 316 may be further configured to determine the operating frequency band sequence 318 or to perform an update of the operating frequency band sequence 318 after initial establishment of the wireless communication link. This operating frequency band sequence 318 may define an ordered sequence of operating frequency bands (and/or associated channels) according to which the STA 115 and AP 105 may periodically change the operating frequency band 304 over which the devices communicate.

Furthermore, the operating frequency band sequence determining component 316 may be configured to obtain the operating frequency band sequence 318 by executing an algorithm for generating a sequential list of operating frequency bands consisting of a randomly-reordered set of available operating frequency bands. In an aspect, this algorithm may include a random number generator component that takes a seed as input and generates an operating frequency band sequence 318 based on this seed. In a non-limiting aspect, a unique identifier (e.g., a Media Access Control (MAC) address) of the STA 115 or the AP 105 or a combination (e.g., concatenation or other numerical combination) of the individual unique identifiers may be used as the seed, though any other available number may be utilized for a seed.

Furthermore, the set of available operating frequencies may include a set of one or more operating frequency bands defined by a particular wireless communication protocol according to which STA 115 and AP 105 may communicate. For instance, in some examples, STA 115 and AP 105 may communicate according to one or more MAC and/or physical layer specifications of the IEEE 802.11 family of protocols, which includes, for example, the 802.11-1997, 802.11a, 802.11b, 802.11g, 802.11-2007, 802.11n, 802.11-2012, 802.11ac, 802.11ad, 802.11af. 802.11ah, 802.11ai, 802.11aj, 802.11aq, 802.11ax, and 802.11ay protocols. Each of these protocols may have an associated available bandwidth (that may differ among some of the individual 802.11 protocol releases) that may be further divided into one or more available wireless communication channels each having an associated operational frequency band. Of these one or more available wireless communication channels, a subset of channels may be selected such that no channel in the subset has an associated operating frequency that is associated with any other channel. As such, the channels of this subset may be referred to as "non-overlapping channels." In an optional aspect of the disclosure, the operating frequency band sequence determining component 316 may be configured to determine a set of non-overlapping channels associated with the protocol to be utilized for communication with a paired device and may form the operating frequency band sequence 318 from this non-overlapping channel subset. In some examples, however, the operating frequency band sequence 318 may be configured to contain one or more overlapping channels or a mixture of overlapping and non-overlapping channels.

In an additional aspect, rather than performing an operating frequency band change based on a discrete operating frequency band sequence 318, a request generating component 320 of the channel manager 202 of either of the STA 115 or AP 105 may be configured to asynchronously generate a request to change operating frequency band 304 to a target operating frequency band 314. For instance, the channel quality manager 310 of trigger condition detecting component 302 may be configured to detect that a receiver frame decoding failure rate exceeds a receiver frame decoding failure rate threshold value and to detect that a transmission packet error rate exceeds a transmission packet error rate threshold value. If either of these determinations is made by the channel quality manager 310, the trigger condition detecting component 302 may send an indication of the trigger condition to request generating component 320, receipt of which may cause the request generating component 320 to generate the request.

Furthermore, in some examples, the request generated by the request generating component 320 may include a proposed target operating frequency band 314 to which the operating frequency band 304 will be changed. In an aspect, the target operating frequency band obtaining component 312 may be configured to obtain the target operating frequency band 314 to be included in the request using one or more example techniques. For instance, the target operating frequency band obtaining component 312 may be configured to scan all available operating frequency bands, determine the operating frequency band with the best conditions for signal transmission, and set that operating frequency band to the target operating frequency band 314 of the request. In addition, the request generating component 320 may be configured to select a random operating frequency band (e.g., using a random number generation algorithm) of all of the available operating frequency bands in a particular system and use the selected Alternatively, the target operating frequency band obtaining component 312 may obtain the target operating frequency band 314 of the request by negotiating with its paired device. For instance, where the channel manager 202 associated with an STA 115, the pair device is the AP 105, and vice versa. Therefore, in an example where the STA 115 is generating the request, target operating frequency band obtaining component 312 may initiate a scan of all available operating frequency bands of the communication protocol and may generate a list of acceptable operating frequency bands based on one or more quality characteristics obtained during the scan. Thereafter, the STA 115 may transmit the list to the AP 105, which may perform a scan of all available operating frequency bands in the protocol to generate a similar list of acceptable operating frequency bands. The AP 105 may then return its list to the STA 115, where the AP list may be compared to the STA list. If any available operating frequency bands are common to both lists, the target operating frequency band obtaining component 312 may choose one of these common operating frequency bands to include in the request. This choice may be made, for example, by selecting the common operating frequency band that displayed the best quality characteristics during the scan performed by the STA 115, or may be chosen randomly. Alternatively, the STA 115 may negotiate with AP 105 to determine a mutually-preferred target operating frequency band 314.

In an aspect, the request generating component 320 may insert the request into a stand-alone request message and pass this request to the transceiver 306 for transmission to the AP 105. The AP 105 may determine whether to approve or deny the request and may transmit a response that indicates whether the request is accepted. After transmitting the request (or after the response indicating approval is accepted), the frequency tuner 324 may tune the transceiver 306 to the approved target operating frequency band 314 and the STA 115 and AP 105 may begin packet communication over the new operating frequency band 304. In an aspect, as indicated by the dotted line surrounding box 306, transceiver 306 may optionally be a sub-component of channel manager 202, or, in other examples, may be located outside of channel manager 202 as a stand-alone component (see, e.g., FIG. 14). Furthermore, the transceiver may include one or more antennas configured to transmit and/or receive wireless signals and associated packets. In one non-limiting example, the transceiver may include four dual-band antennas configured to transmit at approximately 36 dBm.

In addition, as both STA 115 and AP 105 are configured to initiate a request to change the operating frequency band 304 of the communication link 125, both devices may also contain a response generating component 322, which may be configured to receive a request from a requesting device and approve or deny the request. In some examples, the response generating component 322 may inspect the request to obtain the target operating frequency band 314, and may perform a scan on the target operating frequency band 314 to determine whether interference is present on the band at the location of the device. Where a level of interference on the target operating frequency band 314 is below a threshold value, the response generating component 322 may generate a response indicating that the request is approved and may instruct the frequency tuner 324 to transmit the response to the other pair device over the present operating frequency band 304. Alternatively, the response generating component 322 may command the frequency tuner 324 to tune the transceiver 306 to the target operating frequency band 314 before transmitting the request. In either example alternative, once the transceiver 306 has been tuned to the target operating frequency band 314, the device may commence packet communication over the post-change operating frequency band 304, which is set to be equal to the target operating frequency band 314.

In an additional aspect, channel manager 202 may be configured to transmit a request to change the operating frequency band 304 to a target operating frequency band 314 in a RTS message and to transmit a CTS message in response to receiving an RTS message. For instance, in some examples, upon detection of a trigger condition by the trigger condition detecting component 302, the request generating component 320 may generate an RTS message that includes a target operating frequency band 314, for example, in a frame control field of the RTS message. In addition, the transceiver 306 may be configured to transmit the RTS message over each available operating frequency band (or channel) utilized by the protocol used for communication by the paired devices. Furthermore, the frequency tuner 324 may be configured to tune the transceiver 306 to the target operating frequency band 314 that was included in the RTS message in order to receive a response to the RTS message, as the pair device may be configured to transmit the response over the target operating frequency band 314. In some examples, the response may indicate that the target operating frequency band is not clear, which may prompt the request generating component 320 to transmit another RTS that includes another, differing, target operating frequency band 314.

In other examples, however, the transceiver may receive a CTS message over the target operating frequency band 314 in response to transmitting the RTS message. This CTS message may indicate that the RTS has been approved and may cause the frequency tuner 324 to tune the transceiver 306 to the target operating frequency band 314 that was included in the RTS message after the CTS message is received, thereby replacing a current operating frequency band 304 with the value of the target operating frequency band 314. Thereafter, the device (STA 115 or AP 105) and its pair device (AP 105 or STA 115, respectively) may communicate wirelessly over the new operating frequency band 304, for example, until a new trigger condition is detected.

Furthermore, in some examples, rather than generating and transmitting the RTS, the device containing channel manager 202 may instead receive an RTS from its pair device. In such examples, the response generating component 322 may be configured to decode the RTS message received by the transceiver 306 to determine a target operating frequency band 314 proposed by the transmitting pair device. When the target operating frequency band 314 has been identified, the response generating component 322 may be configured to command the transceiver 306 to scan the target operating frequency band 314 to determine whether an acceptably low level of interference exists on the target operating frequency band 314 or obtain other information that may be indicative of the channel conditions on the target operating frequency band 314. When it is determined that the conditions on the target operating frequency band 314 are acceptable for communication between the paired devices, the response generating component 322 may generate a CTS message that indicates to the requesting device that the request is approved. Thereafter, the frequency tuner 324 may tune the transceiver 306 to the target operating frequency band 314 that was included in the RTS message, thereby replacing a current operating frequency band 304 with the value of the target operating frequency band 314.

Alternatively, the response generating component 322 may determine that the conditions on the target operating frequency band 314 are not acceptable for communication between the paired devices, for instance, due to a relatively high level of interference (e.g., above a predefined interference level threshold or any other channel quality metric threshold), the response generating component 322 may generate a response that indicates that it is not clear to send messages on the target operating frequency band 314. The response generating component 322 may pass the message to transceiver 306 for transmission to the pair device over the operating frequency band 304.

FIGS. 4-13 are described below and provide details regarding various methods or approaches that may be used for wireless communication channel management for a communication link between two devices (e.g., an STA 115 and an AP 105). For instance, these figures describe example methods whereby one or both of the devices (e.g., paired devices) may detect that a trigger condition exists for changing an operating frequency band for the communication link and may change the operating frequency band to a target operating frequency band over which the paired devices may continue wireless communication. In some examples, which will be described in further detail in reference to FIGS. 5 and 6, the paired devices may each be configured to determine an operating frequency band sequence that defines a periodic succession of operating frequency bands to which the paired devices may each sequentially change. Furthermore, as described in reference to FIGS. 7 and 8, instead of changing the operating frequency band according to a strict periodic schedule, the paired devices may be configured to change an operating frequency band after a threshold time has elapsed since a most recent successful transmission of a data packet, a most recent successful transmission of a pilot packet, or a most recent operating frequency band change. In an additional aspect, which is described in relation to FIGS. 9-13 below, each of the paired devices may be configured to determine that a trigger event has occurred when one or more performance properties associated with prior communications on a present operating frequency band drops below a threshold value. Based on such a determination, a device may generate and transmit a request to change the operating frequency band that includes a proposed target operating frequency band to which the devices may change the operating frequency band for continued communication. In a further example, the device may receive a response to the request indicating that the request is approved, the paired devices may thereafter change the operating frequency band to the target operating frequency band. In an aspect, the request and the response may be implemented in an RTS message and a CTS message, respectively.

Figure 4:
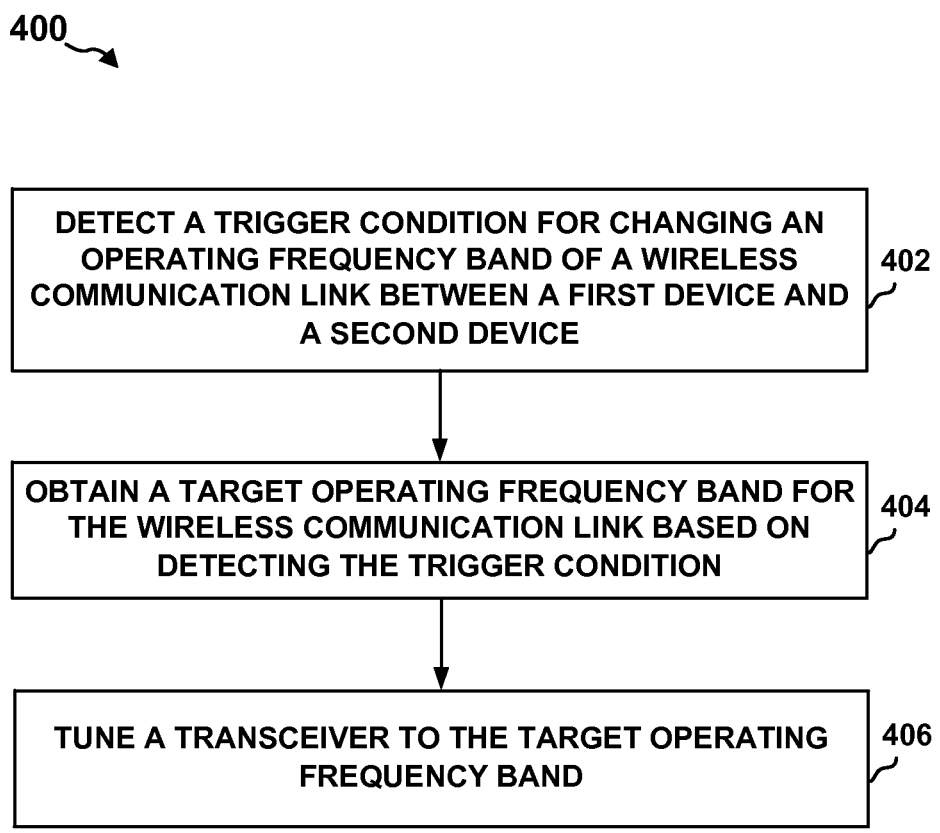
FIG. 4 is a flow chart illustrating example aspects of a method for wireless communication channel management.

FIG. 4 shows a flow diagram illustrating an example method 400 for wireless communication channel management in a wireless communication device (e.g., STA 115 and AP 105). Method 400 may include, at block 402, detecting a trigger condition for changing an operating frequency band of a wireless communication link between a first device and a second device (e.g., a mobile station and an access point). In some examples, block 402 may be performed by trigger condition detecting component 302 of FIG. 3.

In an aspect, the trigger condition of block 402 may include one or several possible trigger conditions that may be time-based or channel-condition-based. For instance, where a time-based trigger is utilized, block 402 may include detecting that a first threshold time period since a most recent operating frequency band change has elapsed. In other instances, a time-based trigger may include detecting that a second threshold time period since a most recent successful data packet delivery has elapsed or detecting that a third threshold time period since a most recent successful pilot packet delivery has elapsed. In examples where a channel-condition-based trigger is utilized, block 402 may include detecting that a receiver frame decoding failure rate associated with an operating frequency band exceeds a receiver frame decoding failure rate threshold value or detecting that a transmission packet error rate exceeds a transmission packet error rate threshold value In addition, at block 404, method 400 may include obtaining a target operating frequency band for the wireless communication link based on detecting the trigger condition. In some examples, block 404 may be performed by target operating frequency band obtaining component 312 of FIG. 3. The target operating frequency band may be obtained from an operating frequency band sequence determined by a pair of wireless communication devices during initial establishment of the communication link between the paired devices. In other examples, the target operating frequency band may be determined by performing a scan of one or more available operating frequency bands in a particular protocol used by the paired devices and determining, based on the scan, which of the available operating frequency bands provides an acceptable value (or highest value or values) for one or more channel condition metrics.

In addition, at block 406, method 400 may include tuning a transceiver to the target operating frequency band determined at block 404. In some examples, block 406 may be performed by frequency tuner 324 and/or transceiver 306 of FIG. 3.

Figure 5:
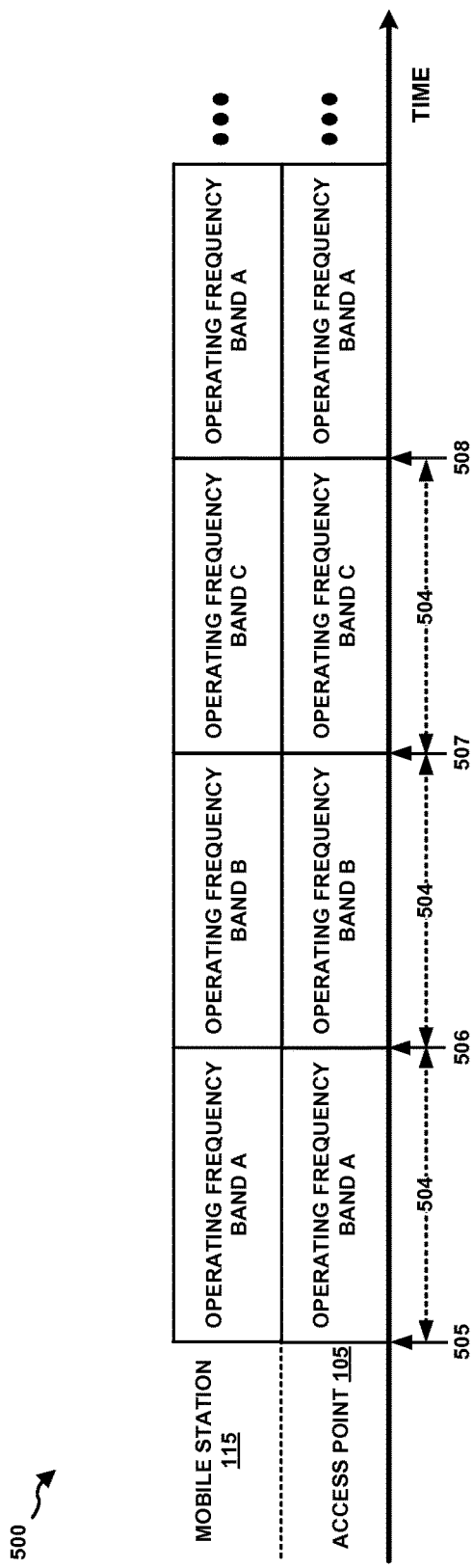
FIG. 5 is a graph illustrating an example timeline of sequential changes to an operating frequency band upon which a first device and a second device may communicate.

FIG. 5 shows a graph illustrating a timeline 500 of sequential changes to an operating frequency band upon which an STA 115 and an AP 105 communicate. In an aspect, the STA 115 and AP 105 may be configured to establish an operating frequency band sequence (e.g., operating frequency band sequence 318 of FIG. 3) made up of a randomly reordered list of available operating frequency bands (or channels) in the communication system utilized by STA 115 and AP 105. According to the present disclosure, in some examples, the STA 115 and AP 105 may periodically change the operating frequency band by setting the operating frequency band to a next operating frequency band in the operating frequency band sequence. In addition, the first threshold time period 504 defines a static period of time for which the STA 115 and AP 105 communicate on a particular operating frequency band before changing to the next operating frequency band in the operating frequency band sequence. In an aspect, the STA 115 and the AP 105 may be configured to set the operating frequency band sequence and the first threshold time period 504 during establishment of the communication link between the devices (e.g., at start-up and/or during an initial handshake operation). Furthermore, one or both of the operating frequency band sequence and the first threshold time period 504 may be obtained by random selection. In other words, the operating frequency band sequence and the first threshold time period 504 may be obtained by implementing a selection algorithm that utilizes random number generator to produce a randomly ordered set of available operating frequency bands (for the operating frequency band sequence) or time period (for the first threshold time period 504). In some examples, a MAC address of the STA 115 and/or the AP 105 may be utilized as the seed for the random number generator, though any other sequence of numbers may be utilized.

In the specific, non-limiting example implementation illustrated in FIG. 5, the operating frequency band sequence may contain at least three operating frequency bands: operating frequency band A, operating frequency band B, and operating frequency band C. Each of these operating frequency bands may be associated with a particular channel that is authorized for communication in a particular wireless system being utilized by an STA 115 and a paired AP 105 for wireless communication. The operating frequency bands available for selection may be limited to those of non-overlapping channels in a particular wireless system, but overlapping channels may also be selected in some examples. In an aspect, such a wireless system may include a wireless system that implements the protocols of any of the IEEE 802.11 family of standards (e.g., a Wi-Fi system). For illustrative purposes, the timeline of FIG. 5 shows three operating frequency bands (A-C), though more or less operating frequency bands may exist in the operating frequency band sequence. Moreover, the letters A-C of the timeline 500 may represent any available channel number or associated operating frequency band that is available for use under a particular wireless communication protocol (e.g., a particular protocol of the IEEE 802.11 family). In some examples, these available channel numbers or associated operating frequencies may correspond to non-overlapping channels of the particular wireless communication protocol. For instance, where IEEE 802.11b is utilized for communication between STA 115 and AP 105, any of A, B, and C may represent channels 1, 6, and 11 (and potentially 14).

As shown in the non-limiting example implementation of FIG. 5, after determining an operating frequency band sequence and first threshold time period during communication link establishment, an STA 115 and AP 105 may begin communication at time 505 over operating frequency band A, which may constitute a first operating frequency band or the operating frequency band sequence. After communicating (e.g, transmitting and receiving one or more packets) for a time period equal to the first threshold time period 504, the STA 115 and the AP 105 may determine that a trigger condition exists based on the passing of the first threshold time period since time 505. As a result of determining that the trigger condition exists, both of STA 115 and AP 105 may change the operating frequency band to operating frequency band B. The STA 115 and the AP 105 may communicate over operating frequency band B for a time period equal to the first threshold time period until determining that a trigger condition exists at time 507, when each of the devices tune to operating frequency band C. Again, the STA 115 and the AP 105 communicate over operating frequency band C for the first threshold time period 504. At time 508, the devices may again determine that a trigger condition exists and may query the operating frequency band sequence to determine a next operating frequency band. In the non-limiting example of FIG. 5, however, operating frequency band C may constitute the final operating frequency band in the operating frequency band sequence. As such, at time 508, the devices may be configured to return to the first operating frequency band in the operating frequency band sequence, operating frequency band A, to continue communication.

Figure 6:
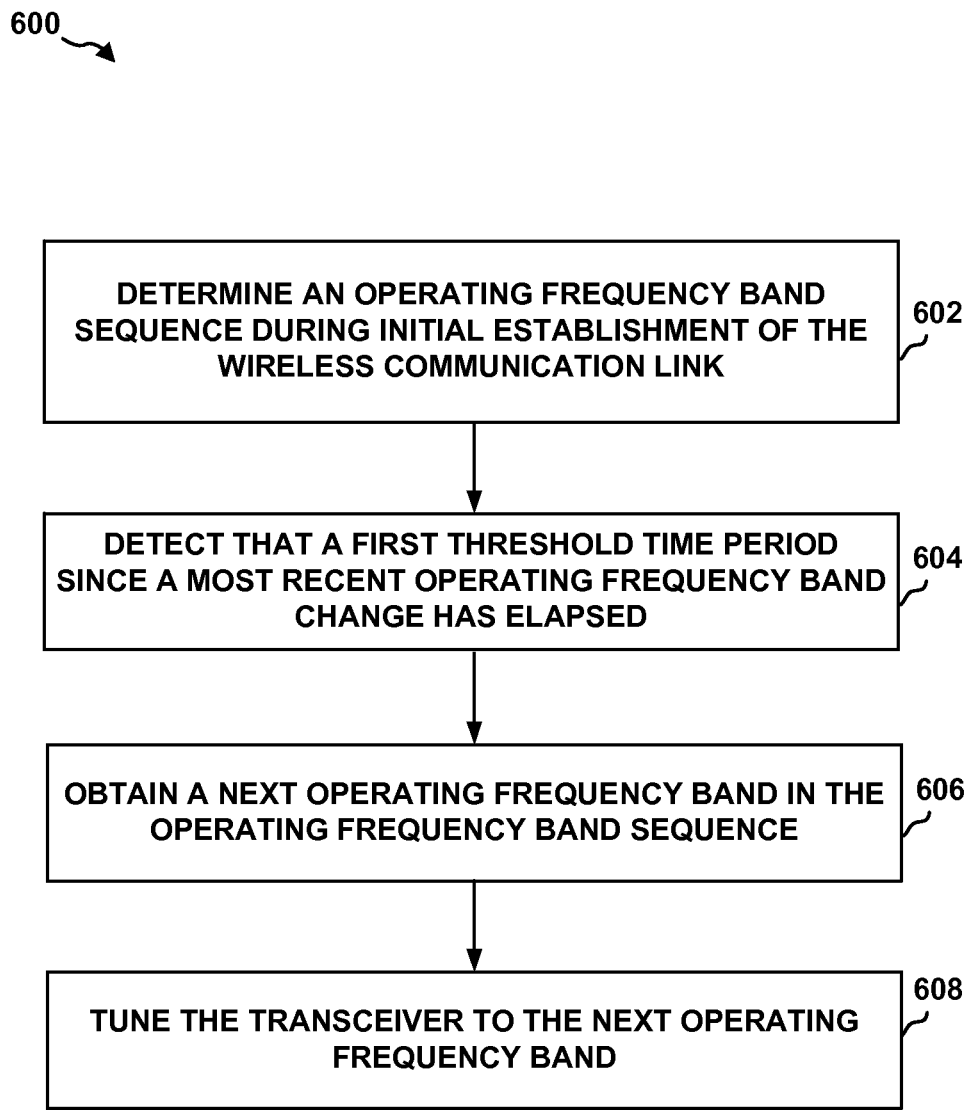
FIG. 6 is a flow chart illustrating example aspects of a method of wireless communication channel management.

FIG. 6 presents a flow diagram illustrating a method 600 for wireless communication channel management that is related to the features described in reference to timeline 500 of FIG. 5. Particularly, method 600 may include periodically changing an operating frequency band upon which an STA 115 and an AP 105 communicate according to an operating frequency band sequence determined by the devices during communication link establishment.

For instance, at block 602, method 600 may include determining a frequency band sequence during initial establishment of the wireless communication link between a first device and a second device, such as, but not limited to, the STA 115 and its pair device, AP 105. Furthermore, as described above, the operating frequency band sequence may be determined, at least partially, by utilizing a random number generator to randomly order a set of operating frequency bands (or corresponding channels) using a seed number such as one or both of the MAC address of the STA 115 and the AP 105. In addition, in some examples, a single device (e.g., STA 115 or AP 105) may be tasked with determining the operating frequency band sequence, although in certain examples, both devices may determine an operating frequency band sequence and the devices may negotiate which operating frequency band sequence to utilize. In an aspect, block 602 may be performed by operating frequency band sequence determining component 316.

In addition, method 600 may include, at block 604, detecting that a first threshold time period since a most recent operating frequency band change has elapsed, which may indicate that a trigger condition exists. In an aspect, block 604 may be performed by trigger condition detecting component 302 and/or time period manager 308 of FIG. 3.

Furthermore, at block 606, method 600 may include obtaining a next operating frequency band in the operating frequency band sequence, for example, in response to detecting that the first threshold time period has elapsed at block 604. In some examples, this next operating frequency band may be considered the target operating frequency band 314 of FIG. 3. Additionally, block 606 may be performed by target operating frequency band obtaining component 312 of FIG. 3.

In addition, at block 608, method 600 may include tuning the transceiver of the device to the next operating frequency band of the operating frequency band sequence (i.e., the target operating frequency band) obtained at block 606, thereby replacing a previous operating frequency band. In an aspect, block 608 may be performed by frequency tuner 324 of FIG. 3.

Figure 7:
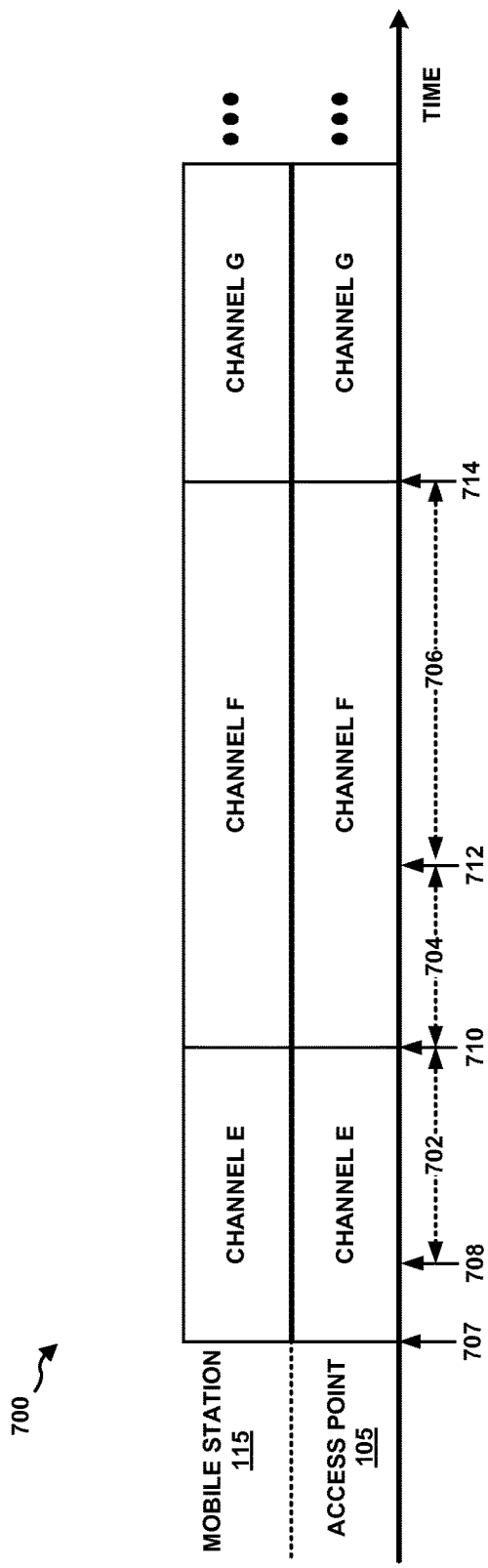
FIG. 7 presents a graph illustrating a timeline of sequential changes to an operating frequency band upon which an mobile station and an access point communicate.

FIG. 7 shows a graph illustrating a timeline 700 of sequential changes to an operating frequency band upon which an STA 115 and an AP 105 communicate. In an aspect, timeline 700 may be similar to timeline 500, except that the first threshold time period of FIG. 5 is not utilized in timeline 700 to determine that a trigger condition exists. Instead, in FIG. 7, the STA 115 and AP 105 may determine that a trigger condition exists based on detecting that a second threshold time period 702 since a most recent successful data packet delivery has elapsed or detecting that a third threshold time period 706 since a most recent successful pilot packet delivery has elapsed.

Like the example implementation of FIG. 5, in the example implementation of FIG. 7, the STA 115 and AP 105 may be configured to establish an operating frequency band sequence (e.g., operating frequency band sequence 318 of FIG. 3) made up of a randomly reordered list (i.e., an operating frequency or channel list having an original order, such as an increasing numerical order, that is rearranged into a random order) of available operating frequency bands (or channels) in the communication system utilized by STA 115 and AP 105. For instance, where an available channel list associated with a particular protocol utilized for communication between the STA 115 and AP 105 is [1, 6, 11], the randomly reordered list may be one of [1, 6, 11] (i.e., the randomly reordered list may have a same order as the available channel list), [1, 11, 6], [11, 1, 6], [11, 6, 1], [6, 1, 11], or [6, 11, 1]. The STA 115 and AP 105 of FIG. 7 may perform any or all of the techniques presented in FIG. 5 regarding obtaining the operating frequency band sequence (e.g., using a random number generator with one or both device MAC addresses as the seed). Furthermore, the second threshold time period 702 and the third threshold time period 706 may also be determined during establishment of the communication link and may further be determined based on an algorithm that utilizes a random number generator that may take one or both device MAC addresses as a seed.

In the specific, non-limiting example implementation illustrated in FIG. 7, the operating frequency band sequence may contain at least three operating frequency bands: operating frequency band E, operating frequency band F, and operating frequency band G. Like operating frequency bands A-C of FIG. 5, each of operating frequency bands E-G may be associated with a particular channel that is authorized for communication in a particular wireless system being utilized by an STA 115 and a paired AP 105 for wireless communication. The frequency bands available for selection may be limited to those of non-overlapping channels in a particular wireless system, but overlapping channels may also be selected in some examples. In an aspect, like the implementation of FIG. 5, such a wireless system of the FIG. 7 implementation may include a wireless system that implements the protocols of any of the IEEE 802.11 family of standards (e.g., a Wi-Fi system). For illustrative purposes, the timeline of FIG. 7 shows three operating frequency bands (E-G), though more or fewer frequency bands may exist in the operating frequency band sequence. Moreover, the letters E-G of the timeline 700 are variable, such that each of E, F, and G may represent any available channel number (or any available non-overlapping channel number) in the wireless system.

As shown in the non-limiting example implementation of FIG. 7, after determining an operating frequency band sequence, the second threshold time period, and the third threshold time period during communication link establishment, an STA 115 and AP 105 may begin communication (e.g, transmitting and receiving one or more data, control, or pilot packets, etc.) at time 707 over operating frequency band E, which may constitute a first operating frequency band or the operating frequency band sequence. At time 708, for instance, the STA 115 may transmit a data packet to the AP 105. However, after the data packet transmission at time 708, the STA 115 may not transmit a further data packet to the AP 105 for a time period equal to the second threshold time period 702. Based on determining that the second threshold time period 702 has elapsed, the STA 115 and the AP 105 may determine that a trigger condition exists at time 710. As a result of determining that the trigger condition exists, both of STA 115 and AP 105 may change the operating frequency band to operating frequency band F, which may be the next operating frequency band in the operating frequency band sequence.

Thereafter, the STA 115 and the AP 105 may continue communicating over operating frequency band F, for instance, until time 712, where AP 105 may transmit a pilot packet (e.g., a pilot or other beacon signal for timing and/or measurement) to the STA 115. After the pilot packet transmission at time 712, however, the AP 105 may not transmit another pilot packet for a time period equal to the third threshold time period 706. As a result of determining that the third threshold time period 706 has elapsed since the last successful pilot packet transmission at time 712, the STA 115 and the AP 105 may determine that a trigger condition exists at time 714. As a result of determining that the trigger condition exists, both of STA 115 and AP 105 may change the operating frequency band to operating frequency band G, which is the next operating frequency band in the operating frequency band sequence. As such, in addition to the periodic operating frequency band change implementation of FIG. 5, the STA 115 and the AP 105 may be further configured to implement an example method whereby a trigger condition is determined to exist based on detecting that a second threshold time period 702 since a most recent successful data packet delivery has elapsed or detecting that a third threshold time period 706 since a most recent successful pilot packet delivery has elapsed.

Figure 8:
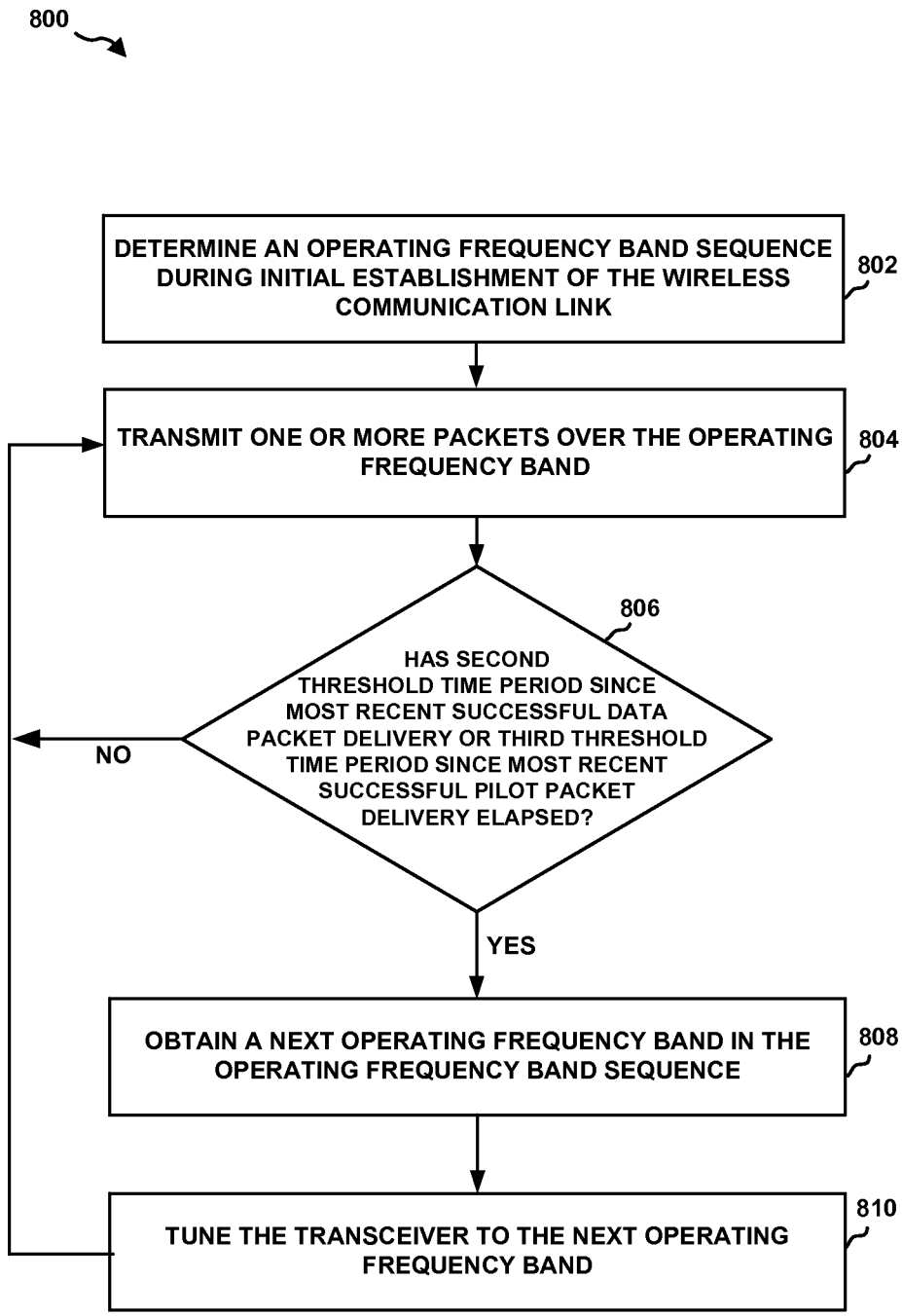
FIG. 8 presents a flow diagram illustrating a method for wireless communication channel management.

FIG. 8 presents a flow diagram illustrating a method 800 for wireless communication channel management that is related to the features described in reference to timeline 700 of FIG. 7. Particularly, method 800 may include aperiodically changing an operating frequency band upon which a first device and a second device (e.g., an STA 115 and an AP 105) communicate according to an operating frequency band sequence determined by the devices during communication link establishment.

For instance, at block 802, method 800 may include determining a frequency band sequence during initial establishment of the wireless communication link between the STA 115 and its pair device, AP 105. Furthermore, as described above, the operating frequency band sequence may be determined, at least partially, by utilizing a random number generator to randomly order a set of operating frequency bands (or corresponding channels) using a seed number such as one or both of the MAC address of the STA 115 and the AP 105. In addition, in some examples, a single device (e.g., STA 115 or AP 105) may be tasked with determining the operating frequency band sequence, although in certain examples, both devices may determine an operating frequency band sequence and the devices may negotiate which operating frequency band sequence to utilize. In an aspect, block 802 may be performed by operating frequency band sequence determining component 316.

In addition, method 800 may include, at block 804, transmitting one or more packets over the operating frequency band. In an aspect, these one or more packets may include, for example, data packets (e.g., video packets, sound packets, or other application data packets), pilot packets (e.g., packets related to a beacon or any other periodically transmitted timing signal or signal for measurement by the pair device), or control packets (e.g., power control packets, timing instructions, channel establishment messages, etc.). Furthermore, in some examples, block 804 may be performed by transceiver 306 of FIG. 3.

Method 800 may proceed, for instance, after the packet transmission, to block 806, which includes detecting whether the second threshold time period 702 since a most recent successful data packet delivery has elapsed or detecting that a third threshold time period 706 since a most recent successful pilot packet delivery has elapsed. Where neither of these determinations is made at block 806, the method 800 may return to block 804 and the devices may continue to communicate over the operating frequency band without change. Where, however, if either detection is made at block 806, it may be determined that a trigger condition exists, and method 800 may proceed to block 808. In an aspect, block 806 may be performed by trigger condition detecting component 302 or time period manager 308 of FIG. 3.

Furthermore, at block 808, method 800 may include obtaining a next operating frequency band in the operating frequency band sequence, for example, in response to detecting that the second threshold time period or the third threshold time period has elapsed at block 806. In some examples, this next operating frequency band may be considered the target operating frequency band 314 of FIG. 3. Additionally, block 808 may be performed by target operating frequency band obtaining component 312 of FIG. 3.

In addition, at block 810, method 800 may include tuning the transceiver of the device to the next operating frequency band of the operating frequency band sequence (i.e., the target operating frequency band) obtained at block 808, thereby replacing a previous operating frequency band. In an aspect, block 810 may be performed by frequency tuner 324 of FIG. 3. After block 810, the method 800 may return to block 804 where the paired devices may continue communicating one or more packets over the new operating frequency band.

Figure 9:
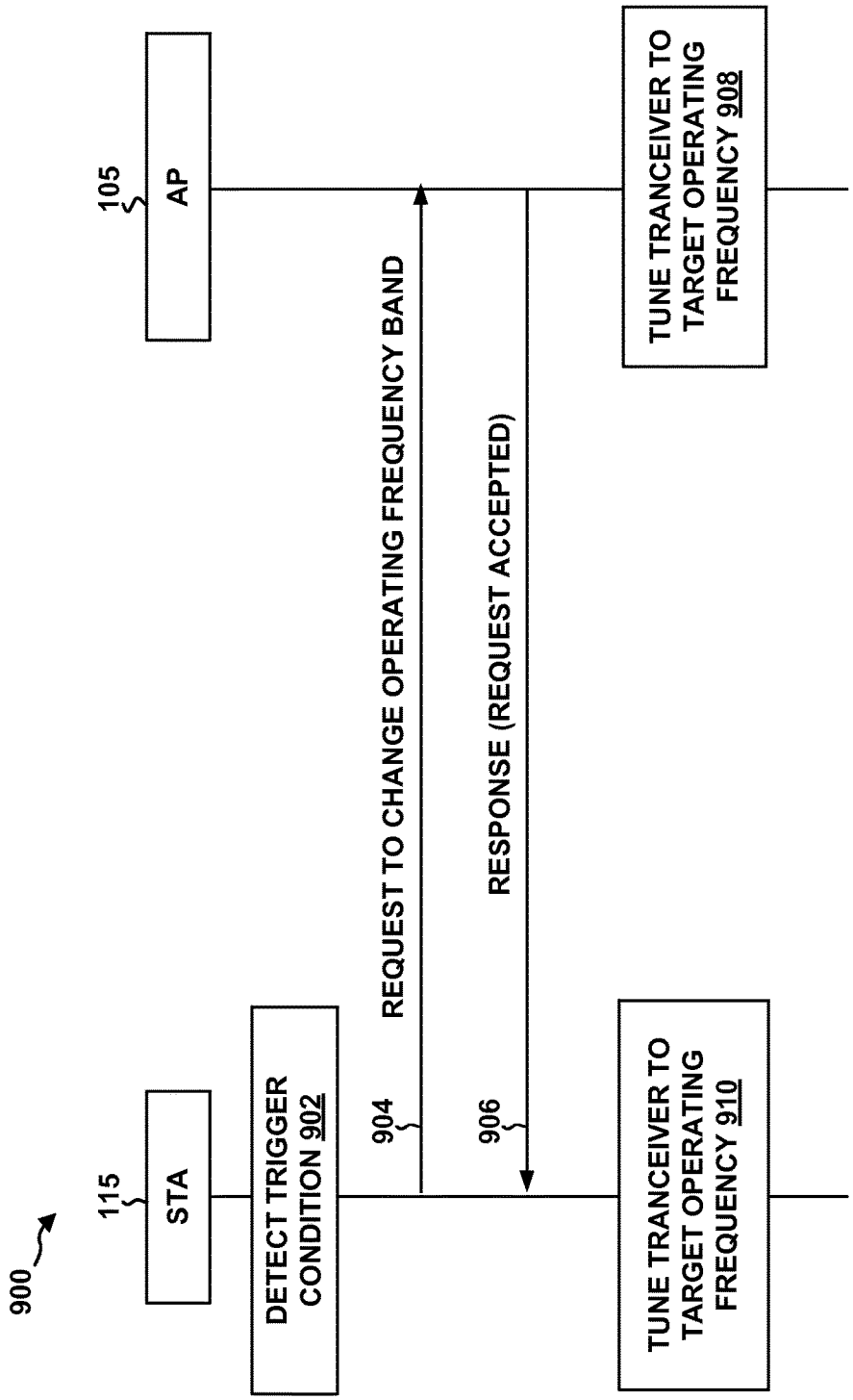
FIG. 9 illustrates an example call flow diagram for performing an example technique for wireless communication channel management.

FIG. 9 illustrates an example call flow diagram 900 for performing an additional technique for wireless communication channel management of the present disclosure. Particularly, call flow diagram 900 presents a technique wherein either of STA 115 or AP 105 may independently determine that a trigger condition exists based on one or more determined channel conditions and may generate a request to change the operating frequency band in response to determining that the trigger condition exists. Furthermore, although call flow diagram 900 illustrates an example implementation where the STA 115 detects the trigger condition and generates the request, the present disclosure further contemplates an example implementation where AP 105 detects the trigger condition and generates the request.

For example, at block 902, an STA 115 may detect that a trigger condition exists. In an aspect, block 902 may include detecting that a receiver frame decoding failure rate over the operating frequency band exceeds a receiver frame decoding failure rate threshold value. Alternatively or additionally, block 902 may include detecting that a transmission packet error rate for one or more previous transmissions over the operating frequency band exceeds a transmission packet error rate threshold value.

Upon detecting that the trigger condition exists at block 902, the STA 115 may generate a request message 904 that includes a request to change the operating frequency band to a target operating frequency band that is included in the request message 904. In some examples, the STA 115 may determine which operating frequency band of any available operating frequency bands for a particular system has channel conditions that are acceptable (e.g., at or above a threshold value) for continued communication between the STA 115 and AP 105. Although not shown in FIG. 9, to determine the target operating frequency band, the STA 115 may scan the available operating frequency bands and obtain one or more channel quality metric measurements (e.g., a signal-to-noise-ratio or any other channel quality metric), and may choose a target operating frequency band based on these measurements.

When the target operating frequency band is determined, the STA 115 may transmit the request message 904 to AP 105, for instance, over an operating frequency band utilized by STA 115 and AP 105 for wireless communication before the trigger condition is detected at block 902. Upon receiving the request message 904, the AP 105 may decode the request message 904 and may determine whether the proposed target operating frequency band is acceptable for continued communication (e.g., by measuring an SNR or other channel quality metric of the proposed target operating frequency band and comparing it against a threshold). Where the AP 105 determines that the target operating frequency band is acceptable, the AP 105 may generate a response message 906 indicating that the request is accepted and may transmit the response message 906 to the STA 115 over the operating frequency band. After transmitting the response message 906, at block 908, the AP 105 may tune its transceiver to the target operating frequency band for continued communication with STA 115. In addition, when the response message 906 is received and decoded by the STA 115 and the STA 115 determines that the response indicates that the request is accepted, the STA 115 may likewise tune its transceiver to the target operating frequency band at block 910 to continue communication with AP 105 over the target operating frequency band.

In some non-limiting examples, the call flow of FIG. 9 may be implemented in the context of an RTS/CTS framework. In such examples, the request message 904 may be an RTS message transmitted by STA 115 over an operating frequency band being utilized for wireless communication between STA 115 and AP 105 before the trigger condition is detected at block 902. After receiving the RTS message, the AP 105 may optionally determine whether the target operating frequency band included in the RTS message is acceptable for further communication, which may be achieved by measuring an SNR or other channel quality metric of the proposed target operating frequency band and comparing it against a threshold. Where the target operating frequency band is acceptable, the AP 105 may generate a CTS message indicating that the STA 115 is free to transmit over the target operating frequency band and may transmit the CTS message to the STA 115 over the operating frequency used by the STA 115 to transmit the RTS. Upon transmission of the CTS message, the AP 105 may tune its transceiver to the target operating frequency to communicate with the STA 115.

In this example RTS/CTS use case, once the CTS message is received, decoded, and otherwise processed by the STA 115, the STA may tune its transceiver to the target operating frequency. Thereafter, the STA 115 may resume communication with the AP 105 over the target operating frequency, which may simply be considered the operating frequency once the CTS has been transmitted by the AP 105 and received by the STA 115.

Figure 10:
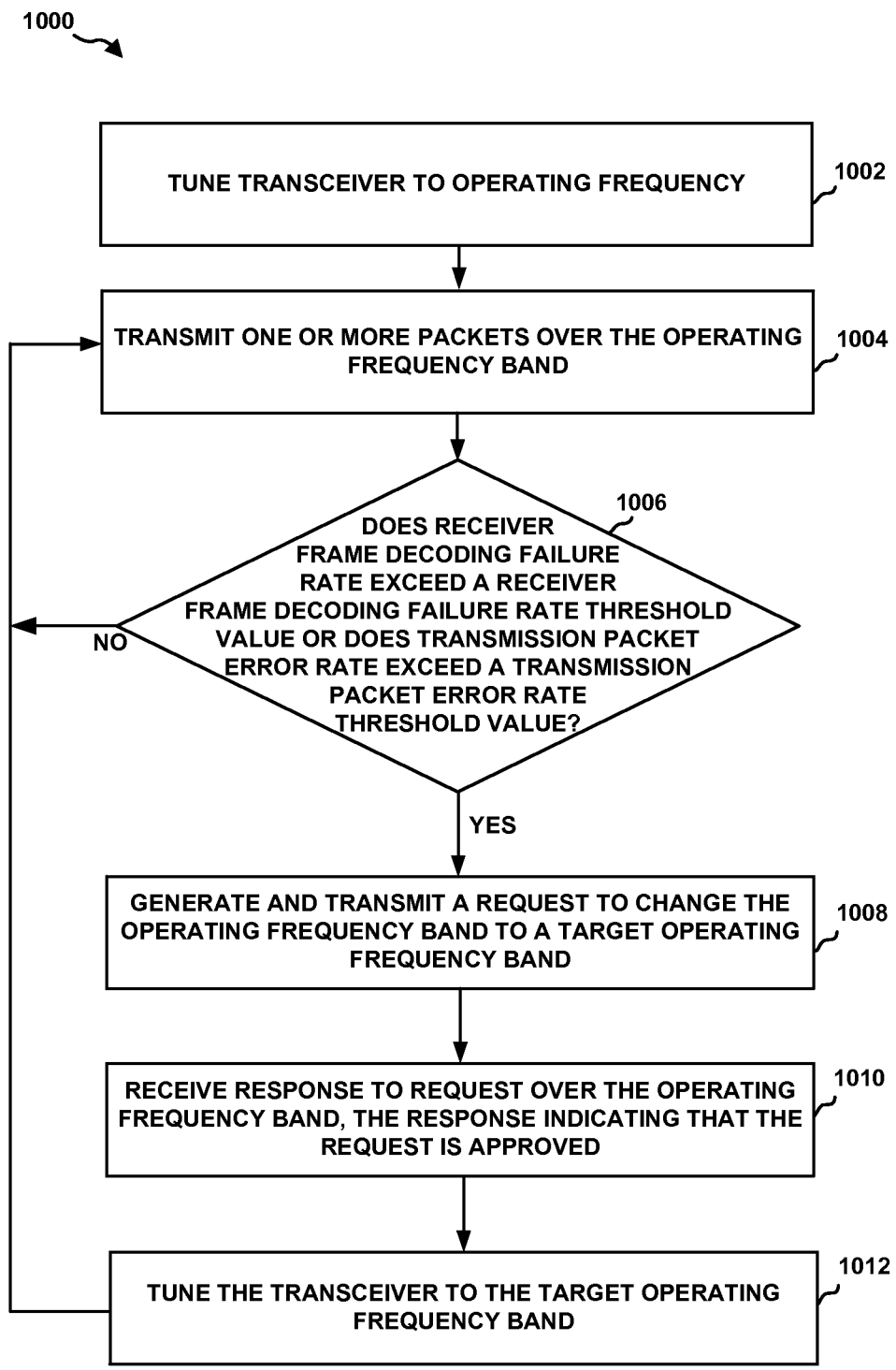
FIG. 10 presents a flow diagram illustrating a method for wireless communication channel management.

FIG. 10 presents a flow diagram illustrating a method 1000 for wireless communication channel management that is related to the features described in reference to call flow diagram 900 of FIG. 9. Particularly, method 1000 may include a first device or second device (e.g., an STA 115 or an AP 105) detecting that a trigger condition exists and transmitting a request to change an operating frequency band to the other pair device based on detecting that the trigger condition exists.

For instance, at block 1002, method 1000 may include initially tuning a transceiver to an operating frequency band at block 1002. In an aspect, block 1002 may be performed by frequency tuner 324 of FIG. 3.

In addition, at block 1004, method 1000 may include transmitting one or more packets over the operating frequency band. In an aspect, these one or more packets may include, for example, data packets (e.g., video packets, sound packets, or other application data packets), pilot packets (e.g., packets related to a beacon or any other periodically transmitted timing signal or signal for measurement by the pair device), or control packets (e.g., power control packets, timing instructions, channel establishment messages, etc.). Furthermore, in some examples, block 1004 may be performed by transceiver 306 of FIG. 3.

Method 1000 may proceed, for instance, after the packet transmission, to block 1006, which includes detecting whether a receiver frame decoding failure rate over the operating frequency band exceeds a receiver frame decoding failure rate threshold value. Alternatively or additionally, block 1006 may include detecting whether a transmission packet error rate for one or more previous transmissions over the operating frequency band exceeds a transmission packet error rate threshold value. Where neither of these determinations is made at block 1006, the method 1000 may return to block 1004 and the devices may continue to communicate over the operating frequency band without change. If, however, either detection is made at block 1006, it may be determined that a trigger condition exists, and method 1000 may proceed to block 1008. In an aspect, block 1006 may be performed by trigger condition detecting component 302 or time period manager 308 of FIG. 3.

At block 1008, method 1000 may include generating and transmitting a request message (or, simply, "a request") to change the operating frequency band to a target operating frequency band. In an aspect, generating the request message may include determining the target operating frequency band of the available operating frequency bands for the communication protocol utilized by the paired devices, which may be based in part on channel condition metrics obtained by performing one or more frequency band-specific scans or tests, as described in relation to FIG. 9. The determined target operating frequency band may be included in the request and may be transmitted to the other paired device for potential approval. The generation of the request at block 1008 may be performed by the request generating component 320 of FIG. 3 and the transmission of the request may be performed by transceiver 306 of FIG. 3.

Method 1000 may proceed to block 1010, where the device may receive a response message (or simply "response") to the request over the operating frequency band. In an aspect, the response may include an indication that the request is approved, which may prompt both pair devices to replace the operating frequency band to the approved target operating frequency band. Block 1010 may be performed by transceiver 306 of FIG. 3.

In response to receiving the response message at block 1010, the method 1000 may proceed to block 1012, where the device may tune the transceiver to the target operating frequency band, for instance, to transmit or receive one or more further packets over the new operating frequency band (i.e., return to block 1004). In an aspect, block 1012 may be performed by frequency tuner 324 of FIG. 3.

Figure 11:
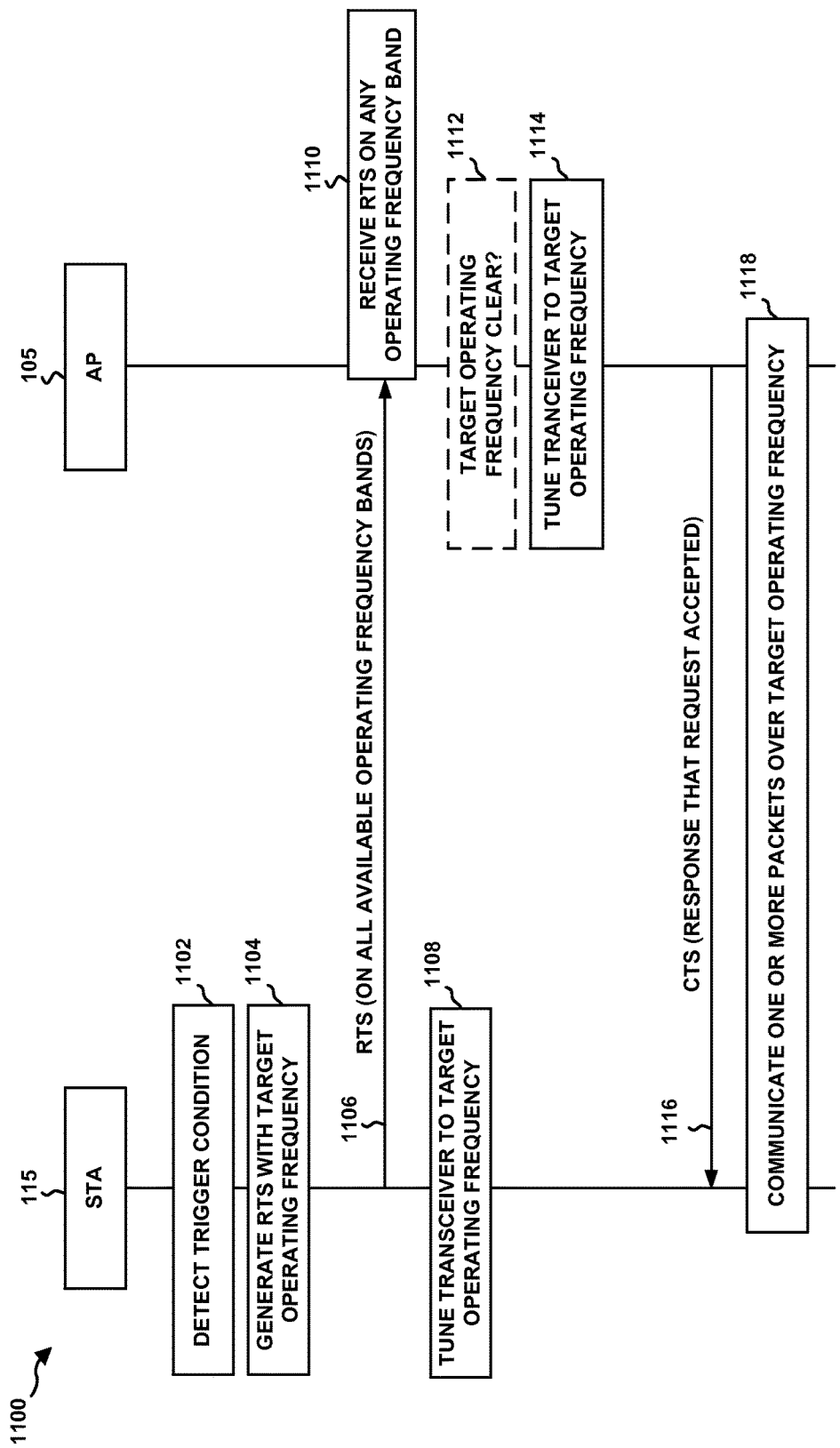
FIG. 11 illustrates an example call flow diagram for performing a technique for wireless communication channel management.

FIG. 11 illustrates an example call flow diagram 1100 for performing an additional technique for wireless communication channel management of the present disclosure. Particularly, call flow diagram 1100 presents a technique wherein either of STA 115 or AP 105 may independently determine that a trigger condition exists based on one or more determined channel conditions and may generate an RTS message 1106 to change the operating frequency band in response to determining that the trigger condition exists. Furthermore, although call flow diagram 1100 illustrates an example implementation where the STA 115 detects the trigger condition and generates the RTS message 1106, the present disclosure further contemplates an example implementation where AP 105 detects the trigger condition and generates the RTS message 1106.

For example, at block 1102, an STA 115 may detect that a trigger condition exists. In an aspect, block 1102 may include detecting that a receiver frame decoding failure rate over the operating frequency band exceeds a receiver frame decoding failure rate threshold value. Alternatively or additionally, block 1102 may include detecting that a transmission packet error rate for one or more previous transmissions over the operating frequency band exceeds a transmission packet error rate threshold value.

In response to detecting that the trigger condition exists at block 1102, the STA 115 may generate a RTS message 1106 at block 1104 that includes a request to change the operating frequency band to a target operating frequency band that is included in the RTS message 1106, for example, in a frame control field of the RTS message 1106. In some examples, the STA 115 may determine which operating frequency band of any available operating frequency bands for a particular system has channel conditions that are acceptable (e.g., at or above a threshold value) for continued communication between the STA 115 and AP 105. Although not shown in FIG. 11, to determine the target operating frequency band, the STA 115 may scan the available operating frequency bands and obtain one or more channel quality metric measurements (e.g., a signal-to-noise-ratio or any other channel quality metric), and may choose the target operating frequency band based on these measurements.

When the target operating frequency band is determined, the STA 115 may transmit the RTS message 1106 on all available operating frequency bands associated with the protocol utilized for communication by STA 115 and AP 105. In some example, these available operating frequency bands may be comprised of the set of non-overlapping channels in a particular IEEE 802.11 standard release. For instance, in a non-limiting example where the 802.11b protocol (2.4 GHz total available band) is used for communication between the STA 115 and the AP 105, the non-overlapping channels (with a 22 MHz channel width) may comprise channels 1, 6, and 11, and, in some cases, channel 14. As such, when transmitting the RTS message 1106, the STA 115 may transmit the RTS message 1106 on each of the operating frequency bands associated with channels 1, 6, and 11 (and potentially channel 14). When an alternative 802.11 protocol is used, the number of non-overlapping channels and the channel number associated with each of the non-overlapping channels may be different than those of the 802.11b protocol. For instance, where a larger total available band (e.g., 2.5 GHz band) is utilized in a particular protocol, in some examples, more than three (or four) non-overlapping channels may be available.

By transmitting the RTS message 1106 on each available operating frequency band (or associated channel), the STA 115 can increase the probability that the AP 105 will receive the RTS message 1106, even if the devices are out of synch (i.e., if the AP 105 is tuned to a different operating frequency band than that of the STA 115). In addition, after transmitting the RTS message 1106, at block 1108, the STA 115 may tune its transceiver to the proposed target operating frequency band included in the RTS message 1106 to receive a potential response from the AP 105.

On the AP 105 side, because the RTS message 1106 was transmitted on all available operating frequency bands, the AP 105 may receive the RTS message on any operating frequency band at block 1110. After receiving the RTS message 1106 at block 1110, the AP 105 may optionally determine whether the target operating frequency band included in the RTS message 1106 is acceptable for further communication (i.e., is "clear") at block 1112. In an aspect, to determine whether the target operating frequency band is clear, or acceptable for further communication, the AP 105 may take one or more channel condition metric measurements (e.g., an SNR measurement or the like) and may determine whether the obtained metric values meet one or more threshold values. In such examples, the AP 105 may determine that the RTS is approved. In other examples, the AP 105 may not perform any determination as to whether the proposed target operating frequency band is clear and may instead immediately approve the RTS.

Where the AP 105 determines that the RTS is approved, at block 1114, the AP 105 may tune its transceiver to the target operating frequency band included in the RTS message 1106. Furthermore, the AP 105 may generate a CTS message 1116 indicating that the RTS is approved and may transmit the CTS message 1116 to the STA 115 over the target operating frequency band. Thereafter, when the CTS message 1116 is received by the STA 115, the STA 115 and the AP 105 may continue communication (i.e., transmission and reception) of one or more packets over the new operating frequency band at block 1118.

In some alternative examples not explicitly depicted in FIG. 11, unlike the example call flow illustrated in FIG. 11, the STA 115 may not tune the transceiver to the target operating frequency at block 1108 upon transmitting the RTS message 1106 over each of a plurality of available operating frequency bands. Instead, the STA 115 may wait to tune the transceiver to the target operating frequency band until the CTS message 1116 is received from the AP 105 over one or more operating frequency bands being utilized by STA 115 and AP 105 for wireless communication before the trigger condition is detected at block 1102.

As such, an alternative example call flow may include receiving a response to the RTS message 1106 over one or more operating frequency bands instead of receiving the response over the target operating frequency band included in the RTS message 1106. Thus, on the AP 105 side, the AP 105 may receive the RTS message 1106 over any particular operating frequency band to which the transceiver and/or antenna of the AP 105 is tuned. Furthermore, after receiving the RTS message 1106, the AP 105 may generate the CTS message 1116. Once the CTS message 116 is generated, the AP 105 may transmit the CTS message 1116 to the STA 115 over one or more operating frequency bands being utilized by STA 115 and AP 105 for wireless communication before the trigger condition is detected at block 1102. In such an example, it follows that the AP 105 may wait until after transmitting the CTS message 1116 over one or more operating frequency bands before tuning its transceiver to the target operating frequency.

According to this alternative, non-limiting example, upon receiving a CTS message 1116 over the one or more operating frequency bands, the STA 115 may tune the transceiver to the target operating frequency band and may proceed with transmitting one or more data packets to the AP 105 over the target operating frequency band.

Figure 12:
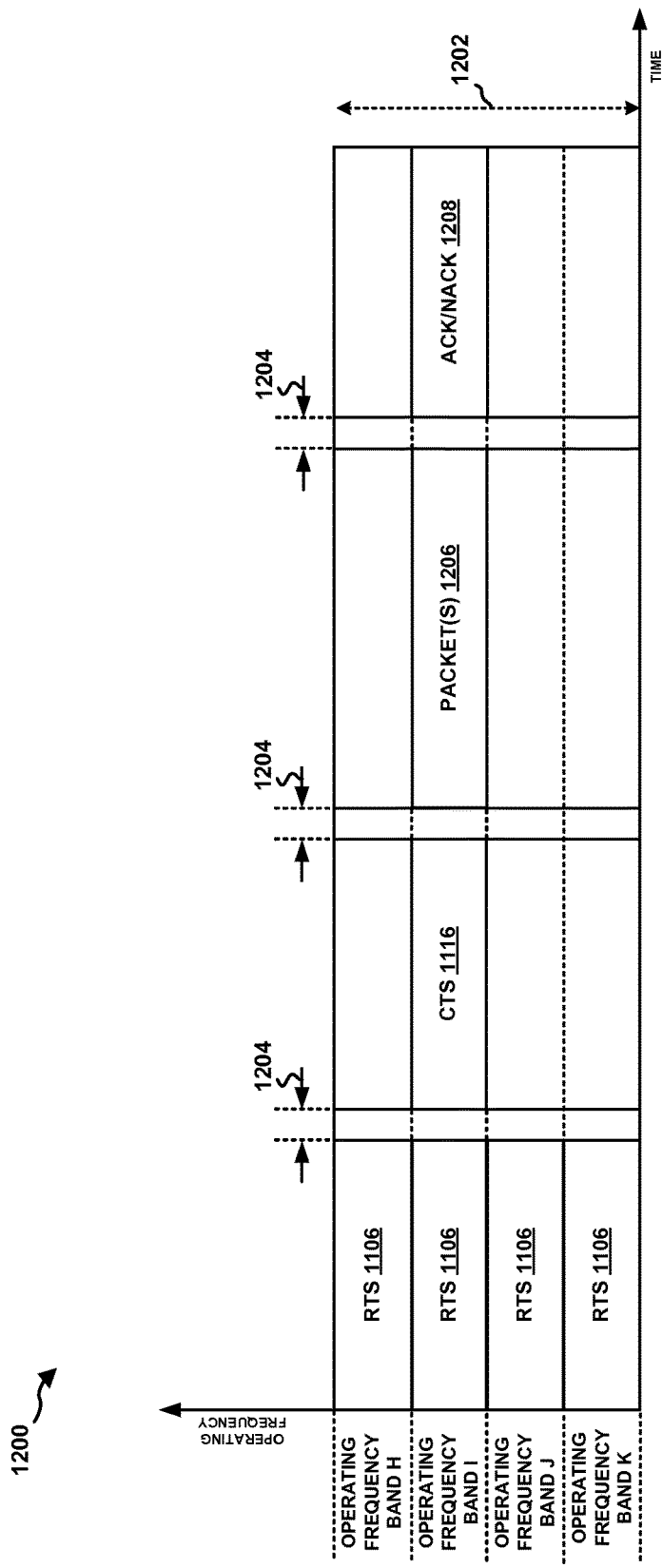
FIG. 12 shows a graph illustrating a timeline of an example RTS message/CTS message process for implanting wireless channel management.

FIG. 12 shows a graph illustrating a timeline 1200 of an example implementation of the RTS message/CTS message process introduced above in reference to FIG. 11. In an aspect, an available communication bandwidth 1202 associated with a wireless communication protocol (e.g., a particular IEEE 802.11 protocol) utilized by STA 115 and AP 105 may be divided into a plurality of permissible operating frequency bands (or channels), which, in some examples, may be non-overlapping frequency bands. Here, the available communication bandwidth 1202 is divided into four permissible operating frequency bands: operating frequency band H, operating frequency band I, operating frequency band J, and operating frequency band K, each of which may be selected as an operating frequency band used for communication between the paired devices STA 115 and AP 105 at any time. Furthermore, although FIG. 12 shows operating frequency bands H-K as including all available communication bandwidth 1202, frequency bandwidth offsets or buffers may exist between each of the operating frequency bands H-K.

As indicated in FIG. 12, a requesting device (either of STA 115 or AP 105) may generate and transmit an RTS message 1106 over each available operating frequency band H-K. By doing so, the requesting device may increase the probability that its paired device (either of AP 105 or STA 115, respectively) will receive the RTS message 1106, even if the paired devices are not presently tuned to the same operating frequency band. In the non-limiting example of FIG. 12, the RTS message 1106 includes a proposed target operating frequency band indicating operating frequency band I. As such, after the RTS message 1106 is transmitted on each of operating frequency bands H-K, the requesting device may tune its transceiver to operating frequency band I in order to receive a CTS message 1116 indicating that the RTS is approved (or, in other examples, to potentially receive an indication that the proposed target operating frequency band is not clear to host communication between the paired devices).

After a Short Interframe Space (SIFS) time period 1204, the requesting device may receive the CTS message 1116 over the target operating frequency band, which corresponds to operating frequency band I in the example implementation of FIG. 12. In an aspect, the SIFS time period 1204 that represents a time required for a message to travel over the air from the transmitting device (here, the requesting device) to a receiving device (here, the paired device that is not the requesting device), to undergo processing at the receiving device (e.g., decoding and performing any potential target operating frequency band condition checks), and a response to the signal to travel back over the air from the receiving device to the transmitting device.

Furthermore, after receiving the CTS message 1116 indicating approval of the request, the requesting device (or its paired device) may transmit one or more packets 1206, which may be received by the pair device after another SIFS time period 1204. In some examples, before transmitting the one or more packets 1206, the device transmitting the one or more packets may be configured to pause for a further back-off time period (e.g., on the order of 10s to 100s of microseconds, for example) before transmitting any of the one or more packets 1206 to ensure that the receiving device has had sufficient time to tune its transceiver to the target operating frequency band. In response to receiving the one or more packets 1206 (or portions thereof) the device that received the one or more packets 1206 may generate and transmit an acknowledgement message (ACK) or a not-acknowledged message (NACK) 1208 indicating whether the one or more packets 1206 were correctly received (e.g., received, decoded, and passed a cyclic redundancy check or the like). The paired devices may continue this packet and ACK/NACK exchange, for instance, until either device detects that a trigger condition exists and therefore generates and transmits a further RTS message 1106 to its paired device.

Figure 13:
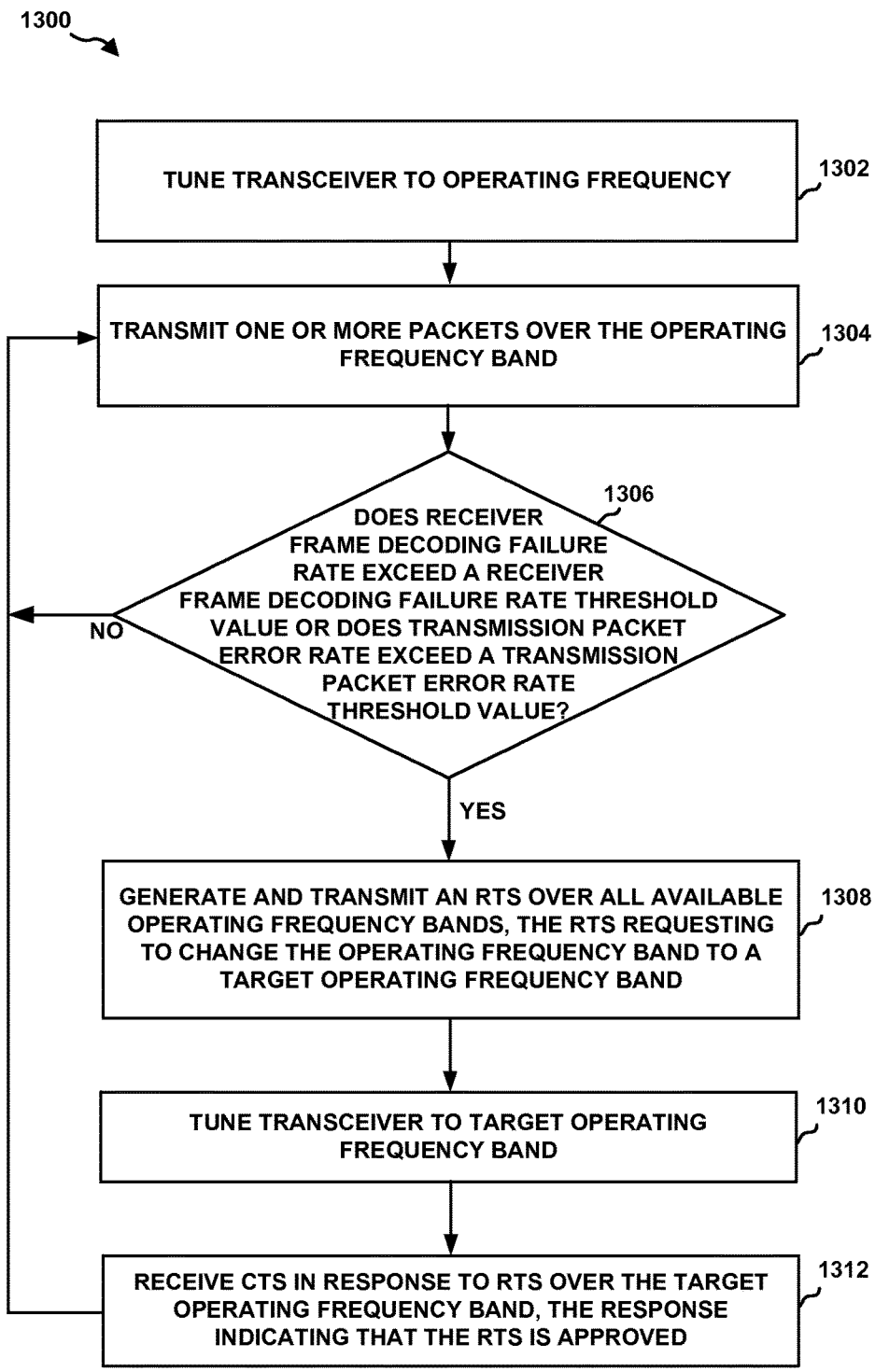
FIG. 13 presents a flow diagram illustrating a method for wireless communication channel management.

FIG. 13 presents a flow diagram illustrating a method 1300 for wireless communication channel management that is related to the features described in reference to call flow diagram 1100 of FIG. 11 and timeline 1200 of FIG. 12. Particularly, method 1300 may include a first device or a second device (e.g., an STA 115 or an AP 105) performing an RTS/CTS message exchange to implement a change in an operating frequency band based on either of the paired devices detecting that the trigger condition exists.

For instance, at block 1302, method 1300 may include initially tuning a transceiver to an operating frequency band at block 1302. In an aspect, block 1302 may be performed by frequency tuner 324 of FIG. 3.

In addition, at block 1304, method 1300 may include transmitting one or more packets over the operating frequency band. In an aspect, these one or more packets may include, for example, data packets (e.g., video packets, sound packets, or other application data packets), pilot packets (e.g., packets related to a beacon or any other periodically transmitted timing signal or signal for measurement by the pair device), or control packets (e.g., power control packets, timing instructions, channel establishment messages, etc.). Furthermore, in some examples, block 1304 may be performed by transceiver 306 of FIG. 3.

Method 1300 may proceed, for instance, after the initial packet transmission or transmissions and any corresponding ACK or NACK transmissions (not shown), to block 1306, which includes detecting whether a receiver frame decoding failure rate over the operating frequency band exceeds a receiver frame decoding failure rate threshold value. Alternatively or additionally, block 1306 may include detecting whether a transmission packet error rate for one or more previous transmissions over the operating frequency band exceeds a transmission packet error rate threshold value. Where neither of these determinations is made at block 1306, the method 1300 may return to block 1304 and the devices may continue to communicate over the operating frequency band without change. If, however, either detection is made at block 1306, it may be determined that a trigger condition exists, and method 1300 may proceed to block 1308. In an aspect, block 1306 may be performed by trigger condition detecting component 302 or time period manager 308 of FIG. 3.

At block 1308, method 1300 may include generating and transmitting an RTS message requesting to change the operating frequency band to a target operating frequency band. In an aspect, generating the RTS message may include determining the target operating frequency band of the available operating frequency bands for the communication protocol utilized by the paired devices, which may be based in part on channel condition metrics obtained by performing one or more frequency band-specific scans or tests, as described in relation to FIG. 9, above, for example. The determined target operating frequency band may be included in the RTS message (e.g., in a frame control field of the RTS message) and may be transmitted to the other paired device for potential approval. In an aspect, the RTS message may be transmitted over all available operating frequency bands associated with a particular communication protocol utilized by the STA 115 and the AP 105. The generation of the RTS message at block 1308 may be performed by the request generating component 320 of FIG. 3 and the transmission of the request may be performed by transceiver 306 of FIG. 3.

Additionally, method 1300 may include tuning the transceiver of the device to the target operating frequency band that was included in the RTS message at block 1308 in order to receive a potential CTS message approving the RTS (or other message indicating that the request is not approved) transmitted by the paired device. In an aspect, block 1310 may be performed by frequency tuner 324 of FIG. 3.

Method 1300 may then proceed to block 1312, where the device may receive a CTS message in response to the RTS message over the target operating frequency band. In an aspect, the CTS message may include an indication that the RTS is approved. In an alternative example that is not shown in FIG. 13, instead of receiving a CTS message, the device may receive an indication that the RTS has not been approved, which may prompt the method 1300 to return to block 1308 to generate and transmit an additional RTS message that includes an alternative target operating frequency band. In an aspect, block 1312 may be performed by transceiver 306 of FIG. 3.

In response to receiving the CTS message at block 1312, the method 1300 may return to block 1304, where the device may transmit or receive one or more further packets over the new operating frequency band.

Figure 14:
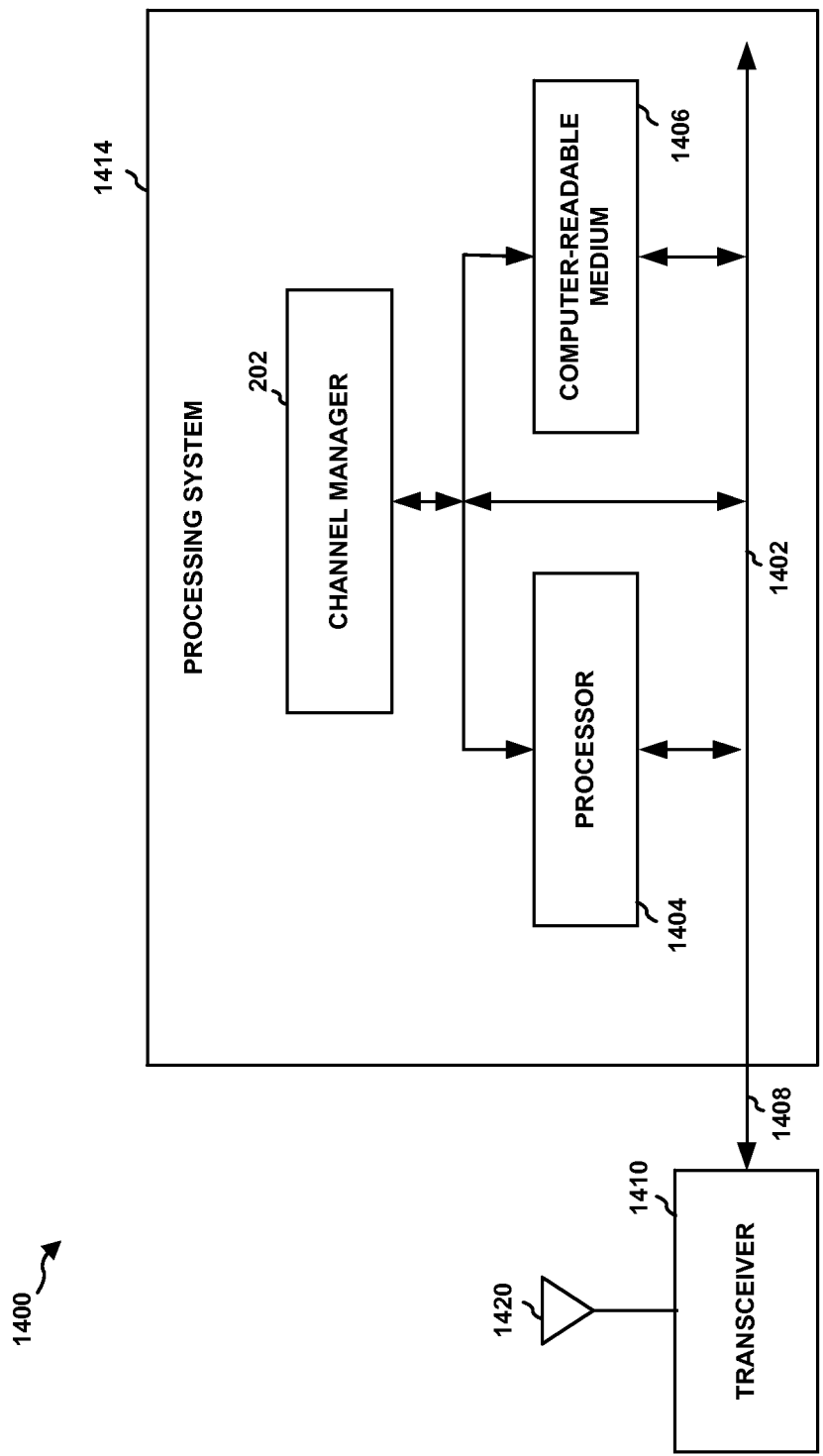
FIG. 14 is a block diagram illustrating an example of a processing system for wireless communication channel management.

FIG. 14 shows a block diagram 1400 illustrating an example of a processing system 1414 configured for performing various techniques described in this disclosure for wireless communication channel management. The processing system 1414 may be implemented with a bus architecture, represented generally by the bus 1402. The bus 1402 may include any number of interconnecting buses and bridges depending on the specific application of the processing system 1414 and the overall design constraints. The bus 1402 links together various circuits including one or more processors and/or hardware modules, represented by a processor 1404, a channel manager 202 (e.g., as described in FIG. 3) and a computer-readable medium/memory 1406. In an aspect, the processor 1404 may correspond to processor 326 of FIG. 3, the computer-readable medium 1406 may correspond to computer-readable medium 328 of FIG. 3, and the processing system 1414 may correspond to STA 115 or AP 105 of at least FIGS. 1 and 2. The bus 1402 may also link various other circuits such as timing sources, peripherals, voltage regulators, and power management circuits, which are well known in the art, and therefore, will not be described any further.

The processing system 1414 may be coupled to a transceiver 1410 via an interface 1408. The transceiver 1410, which may correspond to transceiver 306 of FIG. 3, is coupled to one or more antennas 1420. The transceiver 1410 may provide a means for communicating with various other apparatus or devices over a transmission medium. The transceiver 1410 may receive a signal from the one or more antennas 1420, may extract information from the received signal, and may provide the extracted information to the processing system 1414, specifically the processor 1404 and/or the channel manager 202. In addition, the transceiver 1410 may receive information from the processing system 1414 and/or the channel manager 202, and based on the received information, may generate a signal to be applied to the one or more antennas 1420. The processing system 1414 includes the processor 1404 coupled to the computer-readable medium/memory 1406, and/or to the channel manager 202, which may be an example of the channel manager 202 of FIG. 3.

The processor 1404 is responsible for general processing, including the execution of software stored on the computer-readable medium/memory 1406. The software, when executed by the processor 1404, causes the processing system 1414 to perform the various functions described in the disclosure for wireless communication channel management. The computer-readable medium/memory 1406 may also be used for storing data that is manipulated by the processor 1404 when executing software. The channel manager 202 may be software module running in the processor 1404, resident/stored in the computer readable medium/memory 1406, a hardware module coupled to the processor 1404, or some combination thereof. In some instances, the processor 1404 and the computer readable medium/memory 1406 may be used to perform functions, operations, or features described herein with respect to one or more of the components of a channel manager 202 (e.g., components of an AP 105 or STA 115 of at least FIGS. 1 and 2).

The apparatus and methods have been described in the detailed description and illustrated in the accompanying drawings by various elements comprising blocks, modules, components, circuits, steps, processes, algorithms, and the like. These elements, or any portion thereof, either alone or in combinations with other elements and/or functions, may be implemented using electronic hardware, computer software, or any combination thereof. Whether such elements are implemented as hardware or software depends upon the particular application and design constraints imposed on the overall system. In an aspect, the term "component" as used herein may be one of the parts that make up a system and may be divided into other components.

By way of example, an element, or any portion of an element, or any combination of elements may be implemented with a "processing system" that includes one or more processors. A processor may include a general purpose processor, a digital signal processor (DSP), an application specific integrated circuit (ASIC), a field programmable gate array (FPGA) or other programmable logic component, discrete gate or transistor logic, discrete hardware components, or any combination thereof, or any other suitable component designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP, or any other such configuration.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on transitory or non-transitory computer-readable medium. A non-transitory computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), static RAM (SRAM), dynamic RAM (DRAM), synchronous dynamic RAM (SDRAM); double date rate RAM (DDRAM), read only memory (ROM), programmable ROM (PROM), erasable PROM (EPROM), electrically erasable PROM (EEPROM), a general register, or any other suitable non-transitory medium for storing software.

The various interconnections within a processing system may be shown as buses or as single signal lines. Each of the buses may alternatively be a single signal line, and each of the single signal lines may alternatively be buses, and a single line or bus might represent any one or more of a myriad of physical or logical mechanisms for communication between elements. Any of the signals provided over various buses described herein may be time-multiplexed with other signals and provided over one or more common buses.

The various aspects of this disclosure are provided to enable one of ordinary skill in the art to practice the present invention. Various modifications to examples of implementations presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the examples of implementations described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112 (f), unless the element is expressly recited using the phrase "means for" or, in the case of a method claim, the element is recited using the phrase "step for."

What is claimed is:

1. A method for wireless communication channel management, comprising:
   detecting a trigger condition for changing an operating frequency band of a wireless communication link between a first device and a second device;
   obtaining a target operating frequency band for the wireless communication link based on detecting the trigger condition;
   generating a request to change the operating frequency band to the target operating frequency band based on detecting the trigger condition, wherein the request indicates the target operating frequency band; and
   tuning a transceiver to the target operating frequency band.

2. The method of claim 1, further comprising determining at least one of an operating frequency band sequence or an operating frequency band duration during initial establishment of the wireless communication link, wherein obtaining the target operating frequency band comprises obtaining a next operating frequency band in the operating frequency band sequence.

3. The method of claim 1, wherein detecting the trigger condition comprises at least one of:
   detecting that a first threshold time period since a most recent operating frequency band change has elapsed;
   detecting that a second threshold time period since a most recent successful data packet delivery has elapsed; or detecting that a third threshold time period since a most recent successful pilot packet delivery has elapsed.

4. The method of claim 1, wherein detecting the trigger condition comprises at least one of:
detecting that a receiver frame decoding failure rate exceeds a receiver frame decoding failure rate threshold value; or
detecting that a transmission packet error rate exceeds a transmission packet error rate threshold value.

5. The method of claim 1, further comprising:
transmitting the request over the operating frequency band;
receiving a response to the request over the operating frequency band, wherein the response indicates that the request is approved;
tuning the transceiver to the target operating frequency band based on receiving the response; and
transmitting one or more data packets over the target operating frequency band.

6. The method of claim 1, further comprising:
transmitting the request over each of a plurality of available operating frequency bands;
receiving a response to the request over one or more operating frequency bands, wherein the response indicates that the request is approved;
tuning the transceiver to the target operating frequency band based on receiving the response; and
transmitting one or more data packets over the target operating frequency band.

7. The method of claim 1, further comprising:
transmitting the request over each of a plurality of available operating frequency bands;
tuning the transceiver to the target operating frequency band upon transmitting the request;
receiving a response to the request over the target operating frequency band, wherein the response indicates that the request is approved; and
transmitting one or more data packets over the target operating frequency band.

8. The method of claim 7, wherein:
the request comprises a Request to Send (RTS) message,
the RTS message includes the target operating frequency band in a frame control field, and
the response comprises a Clear to Send message.

9. The method of claim 1, wherein the first device is an unmanned aerial vehicle (UAV) and the second device is a controller associated with the UAV.

10. The method of claim 9, wherein detecting the trigger condition comprises detecting a change in quality of a video stream between the UAV and the controller.

11. An apparatus for wireless communication channel management, comprising:
means for detecting a trigger condition for changing an operating frequency band of a wireless communication link between a first device and a second device;
means for obtaining a target operating frequency band for the wireless communication link based on detecting the trigger condition;
means for generating a request to change the operating frequency band to the target operating frequency band based on detecting the trigger condition, wherein the request indicates the target operating frequency band; and
means for tuning a transceiver to the target operating frequency band.

12. The apparatus of claim 11, further comprising means for determining at least one of an operating frequency band sequence or an operating frequency band duration during initial establishment of the wireless communication link, wherein the means for obtaining the target operating frequency band comprises means for obtaining a next operating frequency band in the operating frequency band sequence.

13. The apparatus of claim 11, further comprising:
means for transmitting the request over the operating frequency band;
means for receiving a response to the request over the operating frequency band, wherein the response indicates that the request is approved;
means for tuning the transceiver to the target operating frequency band based on receiving the response; and
means for transmitting one or more data packets over the target operating frequency band.

14. The apparatus of claim 11, further comprising:
means for transmitting the request over each of a plurality of available operating frequency bands;
means for tuning the transceiver to the target operating frequency band upon transmitting the request;
means for receiving a response to the request over the target operating frequency band, wherein the response indicates that the request is approved; and
means for transmitting one or more data packets over the target operating frequency band.

15. The apparatus of claim 11, wherein the first device is an unmanned aerial vehicle (UAV) and the second device is a controller associated with the UAV.

16. The apparatus of claim 15, wherein the means for detecting the trigger condition comprises means for detecting a change in quality of a video stream between the UAV and the controller.

17. An apparatus for wireless communication channel management, comprising:
a processor; and
a memory coupled to the processor, the memory storing instructions, that when executed by the processor, cause the processor to:
detect a trigger condition for changing an operating frequency band of a wireless communication link between a first device and a second device,
obtain a target operating frequency band for the wireless communication link based on detecting the trigger condition,
generate a request to change the operating frequency band to the target operating frequency band based on detection of the trigger condition, wherein the request indicates the target operating frequency band, and
tune a transceiver to the target operating frequency band.

18. The apparatus of claim 17, wherein the memory further stores instructions, that when executed by the processor, cause the processor to determine at least one of an operating frequency band sequence or an operating frequency band duration during initial establishment of the wireless communication link, wherein the instructions that cause the processor to obtain the target operating frequency band comprise instructions that cause the processor to obtain a next operating frequency band in the operating frequency band sequence.

19. The apparatus of claim 17, wherein the memory further stores instructions that, when executed by the processor, cause the processor to:
transmit the request over the operating frequency band;

receive a response to the request over the operating frequency band, wherein the response indicates that the request is approved;

tune the transceiver to the target operating frequency band based on receiving the response; and transmit one or more data packets over the target operating frequency band.

20. The apparatus of claim 17, wherein the memory further stores instructions that, when executed by the processor, cause the processor to:

transmit the request over each of a plurality of available operating frequency bands;

tune the transceiver to the target operating frequency band upon transmitting the request;

receive a response to the request over the target operating frequency band, wherein the response indicates that the request is approved; and transmit one or more data packets over the target operating frequency band.

21. The apparatus of claim 17, wherein the first device is an unmanned aerial vehicle (UAV) and the second device is a controller associated with the UAV.

22. The apparatus of claim 21, wherein the instructions that cause the processor to detect the trigger condition comprise instructions, that when executed by the processor, cause the processor to detect a change in quality of a video stream between the UAV and the controller caused by interference produced by another UAV, another controller, or both.

* * * * *